(12) United States Patent
Arsenault et al.

(10) Patent No.: US 8,913,488 B2
(45) Date of Patent: Dec. 16, 2014

(54) METHODS AND SYSTEMS FOR ENABLING END-USER EQUIPMENT AT AN END-USER PREMISE TO EFFECT COMMUNICATIONS HAVING CERTAIN ORIGINS WHEN AN ABILITY OF THE END-USER EQUIPMENT TO COMMUNICATE VIA A COMMUNICATION LINK CONNECTING THE END-USER EQUIPMENT TO A COMMUNICATIONS NETWORK IS DISRUPTED

(75) Inventors: Jonathan Allan Arsenault, Orleans (CA); David William Clark, Carp (CA); Eric John Wolf, Stittsville (CA); Sean MacLean Murray, Ottawa (CA)

(73) Assignee: BCE Inc., Montreal (CA)

( * ) Notice: Subject to any disclaimer, the term of this patent is extended or adjusted under 35 U.S.C. 154(b) by 583 days.

(21) Appl. No.: 13/141,922

(22) PCT Filed: Dec. 23, 2008

(86) PCT No.: PCT/CA2008/002281
§ 371 (c)(1),
(2), (4) Date: Sep. 13, 2011

(87) PCT Pub. No.: WO2010/071960
PCT Pub. Date: Jul. 1, 2010

(65) Prior Publication Data
US 2012/0008492 A1  Jan. 12, 2012

(51) Int. Cl.
*H04J 1/16* (2006.01)
*H04W 76/02* (2009.01)
*H04L 12/26* (2006.01)
*H04L 12/24* (2006.01)

(52) U.S. Cl.
CPC ......... *H04W 76/028* (2013.01); *H04L 43/0811* (2013.01); *H04L 41/5009* (2013.01); *H04L 43/0817* (2013.01)
USPC .......................................... 370/225; 370/216

(58) Field of Classification Search
USPC ......... 370/225, 252, 310, 328, 329, 330, 338, 370/401, 400; 455/404.2, 456
See application file for complete search history.

(56) References Cited

U.S. PATENT DOCUMENTS 6,608,557 B1 * 8/2003 Menard et al. ................ 340/506
6,829,478 B1  12/2004 Layton et al.
(Continued)

FOREIGN PATENT DOCUMENTS

WO  WO 00/75900  12/2000
WO  WO 2006011162  2/2006
(Continued)

OTHER PUBLICATIONS

Final Office Action issued by the United States Patent and Trademark Office on Apr. 4, 2012 in connection with U.S. Appl. No. 12/452,278, 21 pages.
(Continued)

*Primary Examiner* — Abdullah Riyami
(74) *Attorney, Agent, or Firm* — Gowling Lafleur Henderson LLP

(57) ABSTRACT

A method for effecting communications, such as telephone calls, accesses to data network sites, alarm system communications, and/or other communications, having certain origins over a communications network. The method comprises: receiving a request for a communication originated by first end-user equipment at a first end-user premise when an ability of the first end-user equipment to communicate via a first communication link connecting the first end-user equipment to the communications network is disrupted; determining, based on an origin of the communication, that the communication is to be effected over the communications network; and causing information pertaining to the communication to be exchanged between the first end-user equipment and the communications network via a wireless communication link established between the first end-user equipment and second end-user equipment at a second end-user premise and a second communication link connecting the second end-user equipment to the communications network. Also provided are apparatus and computer-readable media containing a program element executable by a computing system to perform such a method.

46 Claims, 8 Drawing Sheets

(56) References Cited

U.S. PATENT DOCUMENTS

| | | |
|---|---|---|
| 6,960,998 B2 | 11/2005 | Menard |
| 7,079,020 B2 | 7/2006 | Stilp |
| 8,223,951 B1* | 7/2012 | Edelhaus et al. .......... 379/221.01 |
| 8,630,163 B1* | 1/2014 | Varghis et al. ................ 370/217 |
| 2002/0164996 A1* | 11/2002 | Dorenbosch ................... 455/456 |
| 2004/0117638 A1 | 6/2004 | Monroe |
| 2006/0009266 A1* | 1/2006 | Hara et al. .................... 455/572 |
| 2006/0176863 A1* | 8/2006 | Robinson et al. .............. 370/338 |
| 2007/0032230 A1* | 2/2007 | Pregont ......................... 455/421 |
| 2007/0053306 A1* | 3/2007 | Stevens ........................ 370/252 |
| 2007/0090944 A1 | 4/2007 | Du Breuil |
| 2008/0080365 A1 | 4/2008 | Weeresinghe |
| 2008/0310403 A1 | 12/2008 | Asoh et al. |
| 2009/0003318 A1* | 1/2009 | Sweeney et al. ............... 370/352 |
| 2009/0070681 A1 | 3/2009 | Dawes et al. |
| 2009/0289787 A1 | 11/2009 | Dawson et al. |
| 2011/0009062 A1 | 1/2011 | Anschutz et al. |

FOREIGN PATENT DOCUMENTS

| | |
|---|---|
| WOPCT/CA2008/0002280 | 8/2009 |
| WOPCT/CA2008/0002281 | 8/2009 |
| WOPCT/CA2008/0002282 | 8/2009 |
| WOPCT/CA2008/0002266 | 9/2009 |
| WOPCT/CA2008/0002281 | 2/2011 |
| WOPCT/CA2008/0002282 | 2/2011 |
| WOPCT/CA2008/0002266 | 5/2011 |

OTHER PUBLICATIONS

Non-Final Office Action issued by the United States Patent and Trademark Office on Apr. 25, 2013 in connection with U.S. Appl. No. 13/138,031, 38 pages.

Non-Final Office Action issued by the United States Patent and Trademark Office on Nov. 3, 2011 in connection with U.S. Appl. No. 12/452,278, 19 pages.

Stealth Smoking Enforcement, "Cigarette Smoke Detector: Remote Receivers and Indicators", http://www.vproducts.com/p-long-range-receivers.htm, © 2010 Voice Products, LLC, Pages consulted on Jun. 23, 2011, 2 pages.

Emergency Management, "Emergency Alerting Server Sends Critical Alerts Over SMS and WiFi", http://www.emergencymgmt.com/disaster/Emergency-Alerting-Server-Sends.html, News Report, Sep. 12, 2008, Pages consulted on Dec. 12, 2009, 2 pages.

Office Action issued on Sep. 30, 2013 in connection with U.S. Appl. No. 13/142,249, 26 pages.

Office Action issued on May 29, 2014 in connection with U.S. Appl. No. 12/452,278, 9 pages.

* cited by examiner

METHODS AND SYSTEMS FOR ENABLING END-USER EQUIPMENT AT AN END-USER PREMISE TO EFFECT COMMUNICATIONS HAVING CERTAIN ORIGINS WHEN AN ABILITY OF THE END-USER EQUIPMENT TO COMMUNICATE VIA A COMMUNICATION LINK CONNECTING THE END-USER EQUIPMENT TO A COMMUNICATIONS NETWORK IS DISRUPTED

FIELD OF THE INVENTION

The invention relates generally to telecommunications and, more particularly, to methods and systems for enabling end-user equipment at an end-user premise to effect communications when an ability of the end-user equipment to communicate via a communication link connecting the end-user equipment to a communications network is disrupted.

BACKGROUND

End-user premises such as residences or other buildings (or parts thereof) can be equipped with various pieces of equipment, including phones, computers, alarm system devices and/or other devices (e.g., television units), which can be used to effect telephone calls, accesses to data network sites (e.g., websites), alarm system communications, and/or other communications (e.g., television signals).

Communications effected by end-user equipment at a given end-user premise take place over a communication link, such as a metallic twisted-pair cable, a coaxial cable, an optic fiber cable, or a wireless link, which reaches the given end-user premise and connects the end-user equipment to a communications network. In some situations, an ability of the end-user equipment to communicate via the communication link can be disrupted. For example, in some cases, the communication link can be disrupted, for instance, due to a cut or other physical damage inflicted (accidentally or maliciously) to the communication link or to any other condition preventing the communication link from operating normally. In other cases, software and/or hardware (e.g., a modem) of the end-user equipment used by the end-user equipment to effect communications via the communication link can be disrupted, for instance, due to a defective or inoperative component. In such situations, it may no longer be possible for the end-user equipment to effect telephone calls, accesses to data network sites, alarm system communications, and/or other communications via the communication link. For certain communications, such as alarm system communications potentially indicative of undesirable events (e.g., an intrusion or a fire at the end-user premise) or phone calls originated using particular phones, this difficulty or impossibility to communicate via the communication link may have negative, and in some cases, harmful or fatal consequences.

Accordingly, there exists a need for solutions enabling end-user equipment at an end-user premise to effect telephone calls, accesses to data network sites, alarm system communications, and/or other communications having certain origins when an ability of the end-user equipment to communicate via a communication link connecting the end-user premise to a communications network is disrupted.

SUMMARY OF THE INVENTION

According to a first broad aspect, the invention provides a method for effecting communications over a communications network. The method comprises: receiving a request for a communication originated by first end-user equipment at a first end-user premise when an ability of the first end-user equipment to communicate via a first communication link connecting the first end-user equipment to the communications network is disrupted; determining, based on an origin of the communication, that the communication is to be effected over the communications network; and causing information pertaining to the communication to be exchanged between the first end-user equipment and the communications network via a wireless communication link established between the first end-user equipment and second end-user equipment at a second end-user premise and a second communication link connecting the second end-user equipment to the communications network.

According to a second broad aspect, the invention provides apparatus for effecting communications over a communications network. The apparatus comprises a processing entity configured to: receive a request for a communication originated by first end-user equipment at a first end-user premise when an ability of the first end-user equipment to communicate via a first communication link connecting the first end-user equipment to the communications network is disrupted; and determine, based on an origin of the communication, that the communication is to be effected over the communications network. The apparatus also comprises a routing entity configured to cause information pertaining to the communication to be exchanged between the first end-user equipment and the communications network via a wireless communication link established between the first end-user equipment and second end-user equipment at a second end-user premise and a second communication link connecting the second end-user equipment to the communications network.

According to a third broad aspect, the invention provides computer-readable media containing a program element executable by a computing system to perform a method for effecting communications over a communications network. The program element comprises: program code for causing the computing system to receive a request for a communication originated by first end-user equipment at a first end-user premise when an ability of the first end-user equipment to communicate via a first communication link connecting the first end-user equipment to the communications network is disrupted; program code for causing the computing system to determine, based on an origin of the communication, that the communication is to be effected over the communications network; and program code for causing the computing system to cause information pertaining to the communication to be exchanged between the first end-user equipment and the communications network via a wireless communication link established between the first end-user equipment and second end-user equipment at a second end-user premise and a second communication link connecting the second end-user equipment to the communications network.

According to a fourth broad aspect, the invention provides a method for effecting an alarm system communication originated by an alarm system at a first end-user premise, the first end-user premise including first end-user equipment connected to a communications network via a first communication link. The method comprises: determining that an ability of the first end-user equipment to communicate via the first communication link is disrupted; determining that the alarm system communication is to be effected over the communications network; establishing a wireless communication link between the first end-user equipment and second end-user equipment at a second end-user premise; and causing information pertaining to the alarm system communication to be transmitted to communication equipment associated with an alarm monitoring central via the wireless communication link and a second communication link connecting the second end-user equipment to the communications network.

According to a fifth broad aspect, the invention provides apparatus for effecting an alarm system communication originated by an alarm system at a first end-user premise, the first end-user premise including first end-user equipment connected to a communications network via a first communication link. The apparatus comprises a processing entity configured to: determine that an ability of the first end-user equipment to communicate via the first communication link is disrupted; and determine that the alarm system communication is to be effected over the communications network. The apparatus also comprises a routing entity configured to: establish a wireless communication link between the first end-user equipment and second end-user equipment at a second end-user premise; and cause information pertaining to the alarm system communication to be transmitted to communication equipment associated with an alarm monitoring central via the wireless communication link and a second communication link connecting the second end-user equipment to the communications network.

These and other aspects of the invention will become apparent to those of ordinary skill in the art upon review of the following description of example embodiments of the invention in conjunction with the accompanying drawings.

BRIEF DESCRIPTION OF THE DRAWINGS

A detailed description of certain embodiments of the invention is provided herein below, by way of example only, with reference to the accompanying drawings, in which.

It is to be expressly understood that the description and drawings are only for the purpose of illustration of example embodiments of the invention and are an aid for understanding. They are not intended to be a definition of the limits of the invention.

DETAILED DESCRIPTION OF EMBODIMENTS

Figure 1:
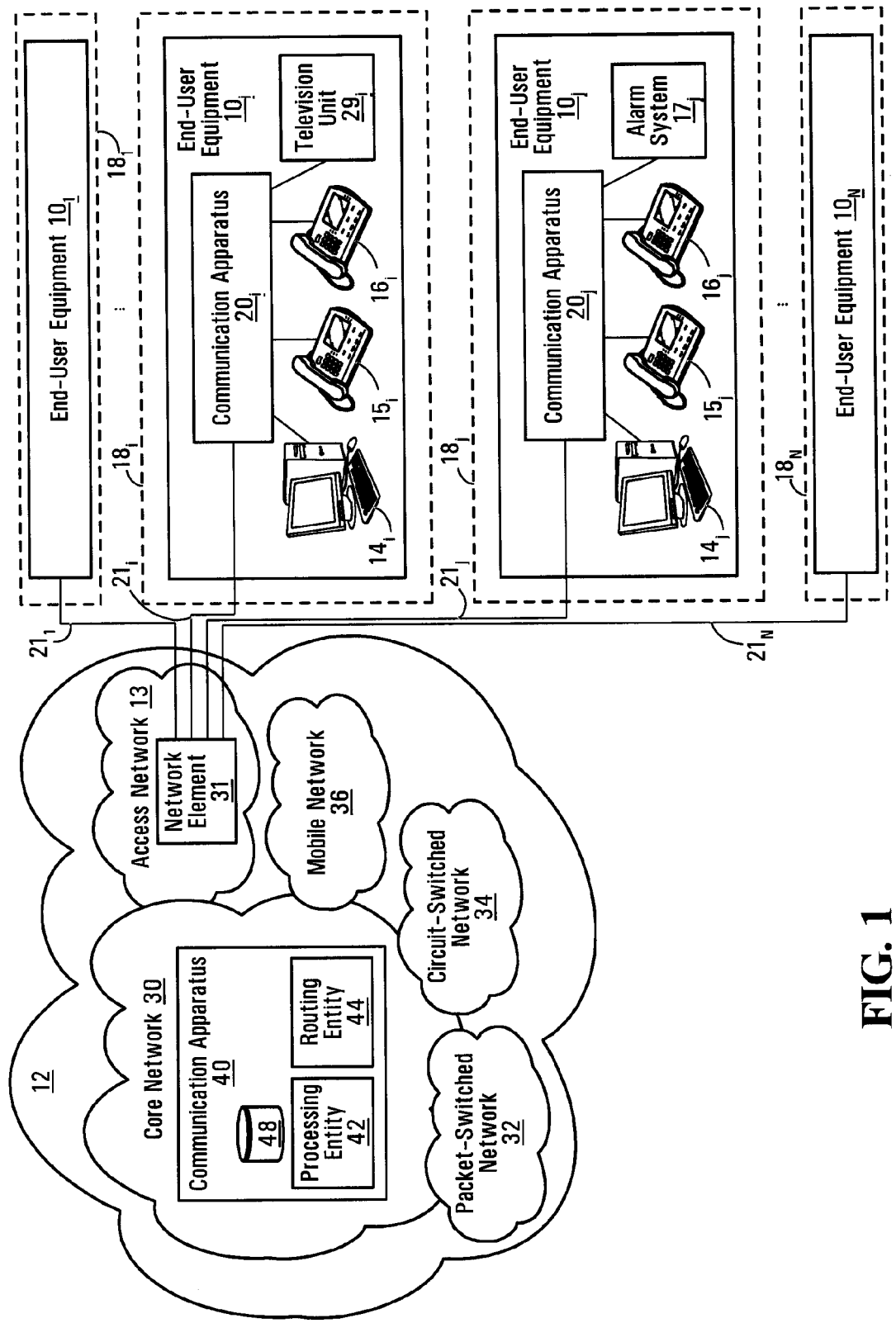
FIG. 1 shows an example of an architecture comprising a communications network allowing end-user equipment located at respective end-user premises to effect various communications, in accordance with an embodiment of the invention.

FIG. 1 shows an example of an architecture comprising a communications network 12 allowing end-user equipment $10_1$-$10_N$ located at respective end-user premises $18_1$-$18_N$ to effect various communications, including telephone calls, accesses to data network sites (e.g., websites), alarm system communications, and/or other communications (e.g., television signals), in accordance with an embodiment of the invention. Each of the end-user premises $18_1$-$18_N$ may be a residence (such as a house or an apartment) or other building (or a part thereof).

The end-user equipment $10_x$ ($1 \leq x \leq N$) at the end-user premise $18_x$ is connected to the communications network 12 via a respective one of a plurality of communication links $21_1$-$21_N$ that reach corresponding ones of the end-user premises $18_1$-$18_N$. In this embodiment, the communication links $21_1$-$21_N$ are part of an access network 13 that is provided by a service provider providing communication services to the end-user premises $18_1$-$18_N$. The access network 13 leads to a core network 30 provided by the service provider to enable the end-user equipment $10_1$-$10_N$ at the end-user premises $18_1$-$18_N$ to effect communications over various networks of the communications network 12, including a packet-switched network 32 (e.g., the Internet), a circuit-switched network 34 (e.g., the Public Switched Telephone Network (PSTN)) and a mobile network 36 (e.g., a Global System for Mobile Communications (GSM) network or other cellular network).

More particularly, in this embodiment, each of the communication links $21_1$-$21_N$ comprises a metallic twisted-pair cable (e.g., a copper twisted-pair cable) or a coaxial cable that is connected to a network element 31 of the access network 13. Also, in this embodiment, the access network 13 is based on a fiber-to-the-node or -neighborhood (FTTN) infrastructure such that the network element 31 comprises a FTTN platform (e.g., an Alcatel 7330 Intelligent Services Access Manager (ISAM) Fiber to the Node (FTTN) platform) which, in addition to being connected to the communication links $21_1$-$21_N$, is connected to optical fiber cabling of the access network 13. The optical fiber cabling is connected to other components of the access network 13 (e.g., one or more routers or switches, an optical Ethernet network, etc.) that interface with the core network 30.

The access network 13 and the communication links $21_1$-$21_N$ may be implemented in various other ways in other embodiments. For example, in some embodiments, the access network 13 may be based on a fiber-to-the-curb (FTTC) infrastructure and the network element 31 may be a FTTC platform. In other embodiments, the network element 31 may be omitted depending on the nature of the access network 13. For instance, in some embodiments, the access network 13 may be based on a fiber-to-the-premises (FTTP) infrastructure (e.g., fiber-to-the-building (FTTB) or fiber-to-the-house (FTTH) infrastructures) in which case the communication links $21_1$-$21_N$ may comprise optical fiber cables leading to optical network terminals (ONTs) that may be part of the end-user equipment $10_1$-$10_N$ at the end-user premises $18_1$-$18_N$. In yet other embodiments, the communication links $21_1$-$21_N$ may comprise a wireless link portion (e.g., a WiMAX link, a satellite-based link, etc.).

The core network 30 comprises a communication apparatus 40 configured to perform various operations when a communication, such as a telephone call, an access to a data network site or an alarm system communication, is originated by, destined for, in progress at certain end-user equipment (such as any of the end-user equipment $10_1$-$10_N$). The communication apparatus 40 comprises suitable hardware, firmware, software or a combination thereof for implementing a plurality of functional entities, including a processing entity 42, a routing entity 44 and a database 48.

The processing entity 42 implements a processing logic to process communications originated by, destined for, or in progress at end-user equipment (such as any of the end-user equipment $10_1$-$10_N$). The processing logic may be defined by a sequence of decisions to be taken with respect to a given communication, which may lead to one or more actions being performed based on those decisions. Each decision taken with respect to the given communication may be based on one or more factors. One example of such a factor is an origin of the given communication which, for instance, may be specified by: a telephone number, an Internet Protocol (IP) address, a Uniform Resource Identifier (URI) (e.g., a Session Initiation Protocol (SIP) URI), and/or another identifier identifying a device that originated the given communication; a name or other identifier of a party that originated the given communication; a time at which the given communication was originated (e.g., a day, hour, minute, etc.); and/or a location (e.g., a civic address) where the given communication was originated. Another example of such a factor is a destination of the given communication which, for instance, may be specified by: a telephone number, an IP address, a URI (e.g., a SIP URI), and/or another identifier identifying a device for which the given communication is destined; a name or other identifier of a party for which the given communication is destined; and/or a location (e.g., a civic address) for which the given communication is destined. In some cases, a factor on which may be based a decision to be taken with respect to the given communication may also be defined in terms of certain information included in the database 48 that may be accessed by the processing entity 42 (e.g., where the given communication is a telephone call, certain information in the database 48 on how to process calls involving a party having originated the telephone call or for which the telephone call is destined may be used by the processing entity 42).

Figure 2:
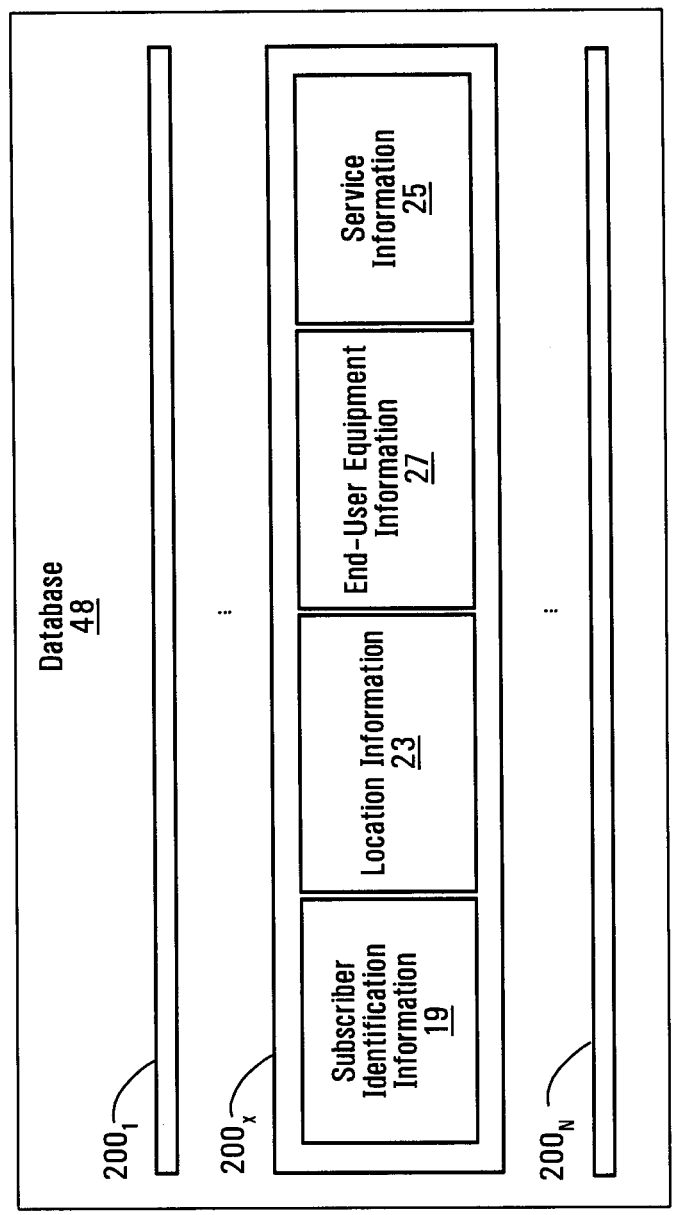
FIG. 2 shows an example of potential contents of a database of a communication apparatus of the communications network shown in FIG. 1.

FIG. 2 shows an example of potential contents of the database 48. In this example, the database 48 stores a plurality of records $200_1$-$200_N$, where each of these records is associated with a subscription to communication services provided by the service provider to a respective one of the end-user premises $18_1$-$18_N$. In other words, each of the end-user premises $18_1$-$18_N$ is associated with a different subscriber (i.e., a person or a group of persons) to which the service provider provides communication services. The database 48 may store other records associated with other subscriptions that are associated with other end-user premises which are served by the service provider.

The record $200_x$ is associated with the subscriber to which communication services are provided at the end-user premise $18_x$ and includes various types of information. More particularly, in this example, the record $200_x$ includes:

subscriber identification information 19 identifying the subscriber. For example, the subscriber identification information 19 may include an account number (e.g., a phone number) and/or another subscriber identifier (e.g., a name);

location information 23 indicating a physical location of the end-user premise $18_x$. For example, the location information 23 may include a civic address, a set of geo-coordinates, and/or any other information that indicates the physical location of the end-user premise $18_x$;

end-user equipment information 27 regarding the end-user equipment $10_x$ at the end-user premises $18_x$, which includes information regarding each of one or more pieces of equipment of the end-user equipment $10_x$. For example, the information regarding a given piece of equipment of the end-user equipment $10_x$ may include an identifier of the given piece of equipment, such as: a Media Access Control (MAC) address, an Ethernet hardware address (EHA), or another hardware identifier of the given piece of equipment; an IP address assigned to the given piece of equipment; a URI (e.g., a SIP URI) identifying the given piece of equipment; or any other information that identifies the given piece of equipment. The end-user equipment information 27 may also include additional information that concerns the end-user equipment $10_x$ at the end-user premise $18_x$, examples of which will be discussed later on; and service information 25 regarding one or more communication services provided to the subscriber by the service provider. For example, the service information 25 may comprise call processing information that is related to processing of calls destined for or originated by the subscriber and that is used by the communication apparatus 40 to process such calls. In some cases, the call processing information may relate to one or more telephony features (e.g., call forwarding, call waiting, calling line identification (CLID) display, etc.) that may be subscribed to by the subscriber.

While this example illustrates certain information that can be included in the records $200_1$-$200_N$ of the database 48, various other information may be included in these records in other embodiments. In addition, while it is depicted in FIG. 1 as being one component, the database 48 may be distributed in nature. For example, in some embodiments, the database 48 can have portions of its content stored in different data storage media possibly located in different components of the communication apparatus 40 that are linked by one or more physical (i.e., wired or wireless) links.

The routing entity 44 is operative to cause one or more actions to be performed based on one or more decisions taken by the processing entity 42 with respect to a given communication, such as route information conveyed by the given communication to a certain piece of equipment which may be, for instance, a certain end-user device or a certain network element (e.g., a router). For example, the routing entity 44 may cause information conveyed by the given communication to be routed via the packet-switched network 32, the circuit-switched network 34, or the mobile network 36. To that end, the routing entity 44 may interact with one or more gateways interfacing with the packet-switched network 32, the circuit-switched network 34, and the mobile network 36

In some embodiments, the processing entity 42, the routing entity 44 and the database 48 may be implemented by a common network component. For example, in some embodiments, the processing entity 42, the routing entity 44 and the database 48 may be implemented by a softswitch or other computer platform. Alternatively, in other embodiments, the processing entity 42, the routing entity 44 and the database 48 may be implemented by two or more different network components that are linked by one or more physical (i.e., wired or wireless) links. For example, in some embodiments, the processing entity 42, the routing entity 44 and the database 48 may be implemented by two or more softswitches or other computer platforms.

The end-user equipment $10_x$ at the end-user premise $18_x$ comprises various pieces of equipment that can be used to effect communications, including telephone calls, accesses to data network sites, alarm system communications, and/or other communications (e.g., television signals). More particularly, the end-user equipment $10_x$ at the end-user premise $18_x$ comprises one or more end-user devices configured to effect communications, such as: one or more telephones, each of which may be, for instance, a wired Plain Old Telephony System (POTS) phone (including a cordless phone), a Voiceover-Internet Protocol (VoIP) phone, a POTS phone equipped with an analog terminal adapter (ATA), a softphone (i.e., a computer equipped with telephony software), or a telephony-enabled television unit (e.g., a set-top box connected to a television and a remote control); one or more computers, each of which may comprise, for instance, a desktop computer, a laptop computer or another personal computer (PC); one or more alarm system devices of an alarm system (sometimes also referred to as a "security system"), each of which may comprise, for instance, a door or window opening detector, a smoke detector, a motion detector, a glass break detector and/or another detector, a controller, and/or another piece of equipment of the alarm system; and/or one or more other end-user devices (e.g., a television unit).

Also, in this embodiment, the end-user equipment $10_x$ at the end-user premise $18_x$ comprises a communication apparatus $20_x$ that is connected to the one or more end-user devices at the end-user premise $18_x$ and to the communication link $21_x$ reaching the end-user premise $18_x$ in order to allow these one or more end-user devices to communicate over the communications network 12 via the communication link $21_x$. The communication apparatus $20_x$ at the end-user premise $18_x$ can thus be viewed as a communications center or hub through which communications originated by, destined for, or in progress at the one or more end-user devices at the end-user premise $18_x$ are effected via the communication link $21_x$ reaching the end-user premise $18_x$.

In some situations, an ability of the end-user equipment $10_x$ to communicate via the communication link $21_x$ can be disrupted (i.e., not normal). For example, in some cases, the communication link $21_x$ can be disrupted, for instance, due to a cut or other physical damage inflicted (accidentally or maliciously) to the communication link $21_x$ (e.g., to a metallic twisted-pair or coaxial cable thereof), a defective or inoperative port of the network element 31 to which the communication link $21_x$ is connected, or any other condition preventing the communication link $21_x$ from operating normally. In other cases, software and/or hardware (e.g., a modem) of the end-user equipment $10_x$ used by the end-user equipment $10_x$ to effect communications via the communication link $21_x$ can be disrupted, for instance, due to a defective or inoperative component. In such situations, it may no longer be possible for the end-user equipment $10_x$ to effect telephone calls, accesses to data network sites, alarm system communications, and/or other communications via the communication link $21_x$ reaching the end-user premise $18_x$. For certain communications, such as alarm system communications potentially indicative of undesirable events (e.g., an intrusion or a fire at the end-user premise $18_x$) or phone calls originated using particular phones, this difficulty or impossibility to communicate via the communication link $21_x$ may have negative, and in some cases, harmful or fatal consequences.

In accordance with an embodiment of the invention, and as further discussed below, when an ability of the end-user equipment $10_x$ to communicate via the communication link $21_x$ reaching the end-user premise $18_x$ is determined to be disrupted, the communication apparatus $20_x$ of the end-user equipment $10_x$ at the end-user premise $18_x$ can cause a wireless communication link to be established between the end-user equipment $10_x$ and the end-user equipment $10_y$ ($1 \leq y \leq N$; $y \neq x$) at the end-user premise $18_y$ in order to allow the end-user equipment $10_x$ to effect communications having certain origins over the communications network 12 via this wireless communication link and the communication link $21_y$ reaching the end-user premise $18_y$. This provides a failover mechanism that enables the end-user equipment $10_x$ at the end-user premise $18_x$ to continue to be able to effect telephone calls, accesses to data network sites, alarm system communications, and/or other communications having certain origins over the communications network 12 despite its ability to communicate via the communication link $21_x$ being disrupted. In other words, despite the ability of the end-user equipment $10_x$ to communicate via the communication link $21_x$ being disrupted, the end-user equipment $10_x$ at the end-user premise $18_x$ continues to be able to effect telephone calls, accesses to data network sites, alarm system communications, and/or other communications having certain origins over the communications network 12 by "piggybacking" on the communication link $21_y$ reaching the end-user premise $18_y$.

Figure 3:
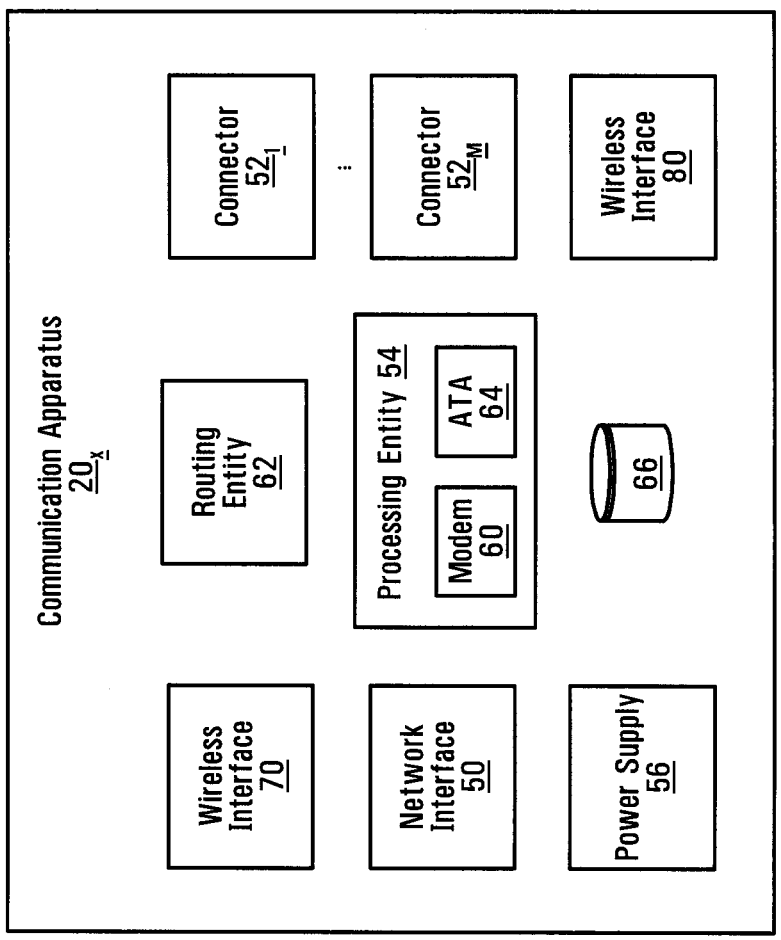
FIG. 3 shows a communication apparatus of the end-user equipment located at one of the end-user premises shown in FIG. 1.

With additional reference to FIG. 3, the communication apparatus $20_x$ of the end-user equipment $10_x$ at the end-user premise $18_x$ comprises suitable hardware, firmware, software or a combination thereof for implementing a plurality of functional entities, including, in this embodiment, a network interface 50, a plurality of connectors $52_1$-$52_M$, a wireless interface 80, a wireless interface 70, a processing entity 54, a routing entity 62, a database 66, and a power supply 56. In some embodiments, these entities of the communication apparatus $20_x$ may be integrated into a terminal installed at a suitable location (e.g., a basement or other location) at the end-user premise $18_x$. In other embodiments, these entities of the communication apparatus $20_x$ may be part of two or more devices interconnected to one another via one or more physical links.

The network interface 50 is connected to the communication link $21_x$ reaching the end-user premise $18_x$ in order to provide an interface between the end-user equipment $10_x$ and the communications network 12. For example, in some embodiments, the network interface 50 may be implemented by a network interface device (NID) and a channel service unit/data service unit (CSU/DSU). In other embodiments, the network interface 50 may be implemented in various other manners depending on the nature of the communication link $21_x$.

The connectors $52_1$-$52_M$ enable connection of one or more end-user devices of the end-user equipment $10_x$ to the communication apparatus $20_x$. For example, individual ones of the connectors $52_1$-$52_M$ may be an RJ11 connector (e.g., for connecting a wired POTS phone), an RJ45 connector (e.g., for connecting a computer or a VoIP phone), an alarm system connector for connecting an alarm system device (e.g., a controller or a detector of an alarm system) or any other type of connector (e.g., a connector for connecting a television set-top box).

The wireless interface 80 is configured to wirelessly exchange information with one or more end-user devices of the end-user equipment $10_x$ at that end-user premise $18_x$. More particularly, the wireless interface 80 comprises a wireless transmitter and a wireless receiver to wirelessly exchange information with one or more end-user devices of the end-user equipment $10_x$. For example, in some embodiments, the wireless interface 80 may be implemented by a wireless router based on WiFi (IEEE 802.11) technology or other wireless communication technologies.

The wireless interface 70 is configured to establish a wireless communication link between the end-user equipment $10_x$ at the end-user premise $18_x$ and the end-user equipment $10_y$ at the end-user premise $18_y$, when the ability of the end-user equipment $10_x$ to communicate via the communication link $21_x$ reaching the end-user premise $18_x$ is determined to be disrupted. More particularly, the wireless interface 70 comprises a wireless transmitter and a wireless receiver to wirelessly exchange information with the end-user equipment $10_y$ at the end-user premise $18_y$. For example, in some embodiments, the wireless interface 70 may be based on WiFi technology or other wireless communication technologies.

The processing entity 54 is configured to receive requests for communications originated by one or more end-user devices of the end-user equipment $10_x$. For example, the processing entity 54 may receive a request for a telephone call originated by a telephone of the end-user equipment $10_x$, a request for an access to a data network site originated by a computer of the end-user equipment $10_x$, a request for an alarm system communication originated by an alarm system device, and/or a request for another type of communication originated by another end-user device of the end-user equipment $10_x$.

The processing entity 54 is also configured to process information pertaining to communications effected by the end-user equipment $10_x$. More particularly, in this embodiment, the processing entity 54 comprises a modem 60 and an analog telephony adapter (ATA) 64. The modem 60 is configured to modulate an analog carrier signal to encode digital information for transmission via the network interface 50 and to demodulate an analog carrier signal received via the network interface 50 to decode information it conveys. For example, in some embodiments, the modem 60 may be a digital subscriber line (DSL) modem or a cable modem, depending on the nature of the communication link $21_x$. The ATA 64 is configured to convert analog telephony signals from any wired POTS phone that may be part of the end-user equipment $10_x$ and connected to one of the connectors $52_1$-$52_M$ into digital information to be processed by the routing entity 62 and the modem 60, and vice versa.

The processing entity 54 is also configured to determine whether the ability of the end-user equipment $10_x$ to communicate via the communication link $21_x$ is disrupted. For example, in this embodiment, the processing entity 54 may monitor the network interface 50 to detect a disruption of the communication link $21_x$ (e.g., detect that no signal is received or transmittable by the network interface 50 via the communication link $21_x$ or detect that a signal received via the communication link $21_x$ at the network interface 50 fails to meet certain quality-of-service criteria). The processing entity 54 may also monitor software and/or hardware of the communication apparatus $20_x$ to detect a defective or inoperative component (e.g., detect that the modem 60 is not operating normally). In other embodiments, the processing entity 54 may determine that the ability of the end-user equipment $10_x$ to communicate via the communication link $21_x$ is disrupted in various other ways, such as based on information received from a source external to the communication apparatus $20_x$ and indicative of a disruption of the ability of the end-user equipment $10_x$ to communicate via the communication link $21_x$ (e.g., the communication apparatus 40 in the core network 30 may determine that the communication link $21_x$ is disrupted and cause the end-user equipment $10_y$ at the end-user premise $18_y$ to transmit information received via the wireless interface 70 of the communication apparatus $20_x$ at the end-user premise $18_x$ and indicative of a disruption of the communication link $21_x$).

In some situations, the processing entity 54 may receive a request for a communication originated by an end-user device of the end-user equipment $10_x$ when the ability of the end-user equipment $10_x$ to communicate via the communication link $21_x$ is disrupted. In such situations, the processing entity 54 is configured to determine, based on an origin of the communication, whether the communication is to be effected over the communications network 12 despite the ability of the end-user equipment $10_x$ to communicate via the communication link $21_x$ being disrupted. In other words, the origin of the communication may indicate a degree of importance of the communication and may thus be used by the processing entity 54 to assess whether the communication should be effected over the communications network 12, despite the ability of the end-user equipment $10_x$ to communicate via the communication link $21_x$ being disrupted. For example, if the communication is an alarm system communication originated by an alarm system device (e.g., potentially indicating an undesirable event such as an intrusion or a fire at the end-user premise $18_x$), the alarm system communication should be effected over the communications network 12, despite the ability of the end-user equipment $10_x$ to communicate via the communication link $21_x$ being disrupted, in view of potential serious, harmful or fatal consequences that can arise. As another example, if the communication is a phone call originated using a particular phone of the end-user equipment $10_x$ which is considered to be a "priority" phone (e.g., because it is in an elderly, sick or disabled person's room) the phone call should be effected over the communications network 12, despite the ability of the end-user equipment $10_x$ to communicate via the communication link $21_x$ being disrupted, in view of its priority status. Other examples of communications having certain origins that may be desired to be effected over the communications network 12 despite the ability of the end-user equipment $10_x$ to communicate via the communication link $21_x$ being disrupted are presented below. The processing entity 54 may determine whether the communication is to be effected over the communications network 12 based on the origin of the communication in various ways, as discussed later on.

The routing entity 62 is configured to cause information transmitted by or destined for the end-user equipment $10_x$ to be exchanged over the communications network 12. More particularly, in this embodiment, when the ability of the end-user equipment $10_x$ to communicate via the communication link $21_x$ is normal (i.e., is not disrupted), the routing entity 62 routes information received via the connectors $52_1$-$52_M$ and/or the wireless interface 80 towards the modem 60 for transmission via the network interface 50 and routes information received from the modem 60 towards the connectors $52_1$-$52_M$ and/or the wireless interface 80 for transmission to one or more end-user devices of the end-user equipment $10_x$. However, when the ability of the end-user equipment $10_x$ to communicate via the communication link $21_x$ is determined to be disrupted (i.e., not normal), and in a situation where the processing entity 54 determines that a communication originated by an end-user device of the end-user equipment $10_x$ is to be effected in view of its origin, the routing entity 62 causes the wireless interface 70 to establish a wireless communication link with the end-user equipment $10_y$ at the end-user premise $18_y$. The routing entity 62 proceeds to route information pertaining to the communication and received via one of the connectors $52_1$-$52_M$ and/or the wireless interface 80 towards the wireless interface 70 such that it is conveyed via the established wireless communication link. The routing entity 62 may also route information pertaining to the communication, conveyed via the established wireless communication link and received via the wireless interface 70 towards the connectors $52_1$-$52_M$ and/or the wireless interface 80 for transmission to one or more end-user devices of the end-user equipment $10_x$.

Figure 4:
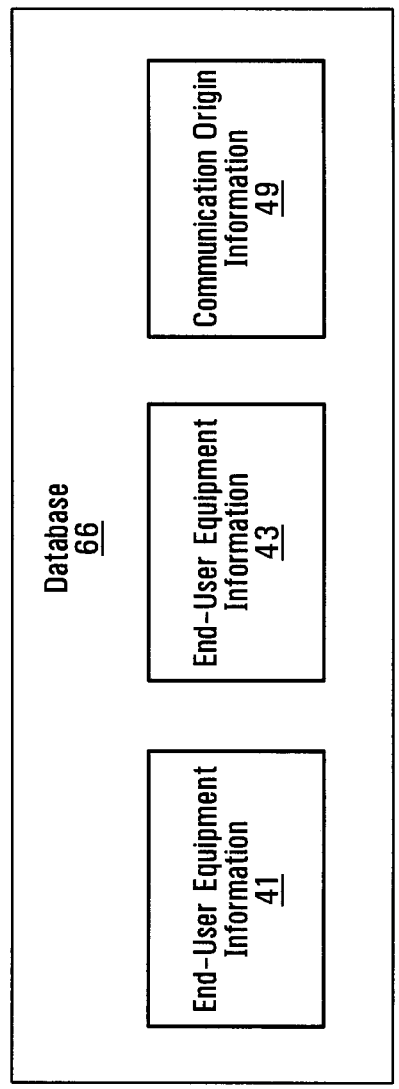
FIG. 4 shows an example of potential contents of a database of the communication apparatus shown in FIG. 3.

The database 66 stores information that can be used by the communication apparatus $20_x$ in operation. FIG. 4 shows an example of potential contents of the database 66.

In this example, the database 66 stores end-user equipment information 41 regarding the end-user equipment $10_x$, which includes information regarding each of one or more pieces of equipment of the end-user equipment $10_x$ (e.g., the communication apparatus $20_x$ and the one or more end-user devices at the end-user premise $18_x$). More particularly, in this example, the information regarding a given piece of equipment of the end-user equipment $10_x$ may include:

an identifier of the given piece of equipment, such as a MAC address, EHA, or other hardware identifier of that piece of equipment, an IP address assigned to that piece of equipment, a URI (e.g., a SIP URI) identifying that piece of equipment, or any other information that identifies that piece of equipment; and depending on the nature of the given piece of equipment, access information to be provided to the given piece of equipment in order to access (i.e., make use of) that piece of equipment. For example, the access information for the given piece of equipment may comprise a code, such as a password or a wireless network key (e.g., a Wi-Fi Protected Access (WPA) key).

In addition, in this example, the database 66 stores end-user equipment information 43 regarding end-user equipment at one or more other ones of the end-user premises $18_1$-$18_N$ that is within wireless range of the end-user equipment $10_x$ at the end-user premise $18_x$. For example, if the end-user equipment $10_z$ ($1 \leq z \leq N$; $z \neq x$) at the end-user premise $18_z$ is within wireless range of the end-user equipment $10_x$ at the end-user premise $18_x$, the end-user equipment information 43 may include information regarding each of one or more pieces of equipment of the end-user equipment $10_z$ (e.g., the communication apparatus $20_z$ and the one or more end-user devices at the end-user premise $18_z$). For instance, the information regarding a given piece of equipment of the end-user equipment $10_z$ may include: an identifier of the given piece of equipment such as a MAC address, EHA, or other hardware identifier of that piece of equipment, an IP address assigned to that piece of equipment, a URI (e.g., a SIP URI) identifying that piece of equipment, or any other information that identifies that piece of equipment; and, depending on the nature of the given piece of equipment, access information to be provided to the given piece of equipment in order to make use of that piece of equipment (e.g., a password or a wireless network key).

The end-user equipment information 41 regarding the end-user equipment $10_x$ may be provided in the database 66 in various ways. For example, in some cases, the identifier of and/or access information for any piece of equipment of the end-user equipment $10_x$ may be provided in the database 66 by a user at the end-user premise $18_x$ when setting up that piece of equipment. In other cases, the identifier of and/or access information for any piece of equipment of the end-user equipment $10_x$ may be provided in the database 66 by the service provider, for example, by the communication apparatus 40 transmitting this information via the communication link $21_x$.

Similarly, the end-user equipment information 43 regarding end-user equipment at one or more other ones of the end-user premises $18_1$-$18_N$ that is within wireless range of the end-user equipment $10_x$ at the end-user premise $18_x$ may be provided in the database 66 in various ways. For example, in some cases, the end-user equipment information 43 may be provided in the database 66 by the service provider, for example, by the communication apparatus 40 transmitting this information via the communication link $21_x$. In other cases, the end-user equipment information 43 may be provided in the database 66 during a provisioning phase (e.g., when the communication apparatus $20_x$ is initially set up at the end-user premise $18_x$) using an exchange of information between the communication apparatus $20_x$ at the end-user premise $18_x$ and the communication apparatus at each of these one or more other ones of the end-user premises $18_1$-$18_N$ that is within wireless range of the end-user equipment $10_x$ at the end-user premise $18_x$.

Furthermore, in this example, the database 66 stores communication origin information 49 regarding one or more origins of communications that are to be effected over the communications network 12 if requested when the ability of the end-user equipment $10_x$ to communicate via the communication link $21_x$ is disrupted. As mentioned previously, the origin of a given communication may be specified, for instance, by: a telephone number, an IP address, a URI (e.g., a SIP URI), a MAC address, EHA or other hardware identifier, and/or another identifier identifying a device that originated the given communication; a name or other identifier of a party that originated the given communication; a time at which the given communication was originated (e.g., a day, hour, minute, etc.); and/or a location (e.g., a civic address) where the given communication was originated. The communication origin information 49 can thus be viewed as indicating which communications are important enough to be effected over the communications network 12 despite the ability of the end-user equipment $10_x$ to communicate via the communication link $21_x$ being disrupted in some situations.

For example, in some embodiments, the communication origin information 49 may comprise: a telephone number, an IP address, a URI (e.g., a SIP URI), a MAC address, EHA or other hardware identifier, and/or another identifier identifying an alarm system device of an alarm system of the end-user equipment $10_x$ (e.g., an IP address, MAC address or other identifier of a controller or detector of the alarm system); a telephone number, an IP address, a URI (e.g., a SIP URI), a MAC address, EHA or other hardware identifier, and/or another identifier identifying a particular phone of the end-user equipment $10_x$ which is such that any telephone call originated using the particular phone is to be effected over the communications network 12 (e.g., an IP address, MAC address or other identifier of a phone in an elderly, sick or disabled person's room); an IP address, a URI (e.g., SIP URI), a MAC address, EHA or other hardware identifier, and/or any other identifier of a utility meter (e.g., a water meter or electric meter) at the end-user premise $18_x$ which is enabled to communicate with a utility company over the communications network 12 via the communication link $21_x$; a period of time which is such that any telephone call originated by the end-user equipment $10_x$ during this period of time is to be effected over the communications network 12 (e.g., from 11:00 PM to 5:00 AM as any telephone call originated during this period of time may be considered important); and/or any other information which, when specifying the origin of a particular communication, indicates that the particular communication is sufficiently important to be effected over the communications network 12 if requested when the ability of the end-user equipment $10_x$ to communicate via the communication link $21_x$ is disrupted. In other embodiments, the communication origin information 49 may comprise other information regarding one or more origins of communications that are to be effected over the communications network 12 if requested when the ability of the end-user equipment $10_x$ to communicate via the communication link $21_x$ is disrupted.

The communication origin information 49 may be provided in the database 66 in various ways. For example, in some cases, part or all of the communication origin information 49 may be provided in the database 66 by a user at the end-user premise $18_x$ when setting up the communication apparatus $20_x$. In other cases, part or all of the communication origin information 49 may be provided in the database 66 by the service provider, for example, by the communication apparatus 40 transmitting this information via the communication link $21_x$.

While this example illustrates certain information that can be included in the database 66, other information may be included in that database in other embodiments. Also, while it is depicted in FIG. 3 as being one component, the database 66 may be distributed in nature. For example, in some embodiments, the database 66 can have portions of its content stored in different data storage media of the communication apparatus $20_x$.

The power supply 56 is configured to power the communication apparatus $20_x$ using electrical power from an electrical network of the end-user premise $18_x$. In addition, the power supply 56 is capable of powering the communication apparatus $20_x$ in cases where the electrical network of the end-user premise $18_x$ does not provide sufficient electrical power (including no electrical power at all) for operation of the communication apparatus $20_x$ (e.g., due to a power outage or a malfunction in the electrical network). For example, the power supply 56 may comprise one or more batteries capable of powering the communication apparatus $20_x$ for a prolonged period of time (e.g., several hours or a few days) before being depleted. The power supply 56 may also comprise charging circuitry for recharging the one or more batteries using electrical power from the electrical network of the end-user premise $18_x$.

While they are shown as distinct entities, different ones of the functional entities of the communication apparatus $20_x$ may be implemented by a common device. For example, the wireless interface 70 and the wireless interface 80 may be implemented by a common wireless router (e.g., a WiFi router). As another example, one or more of the connectors $52_1$-$52_M$ and the ATA 64 may be implemented by a common ATA device. As yet another example, the modem 60 and the network interface 50 may be implemented by a common network interface device. As yet another example, the processing entity 54 and the routing entity 62 may be implemented by a common processing platform. As yet another example, the wireless interface 70, the wireless interface 80, the processing entity 54 and the routing entity 62 may be implemented by a common routing device.

Also, while the communication apparatus $20_x$ is configured in a particular manner in this embodiment, the communication apparatus $20_x$ may be configured in various manners in other embodiments. For example, in some embodiments, the ATA 64 may be omitted in cases where the end-user equipment $10_x$ at the end-user premise $18_x$ does not comprise any POTS phone.

Figure 5A:
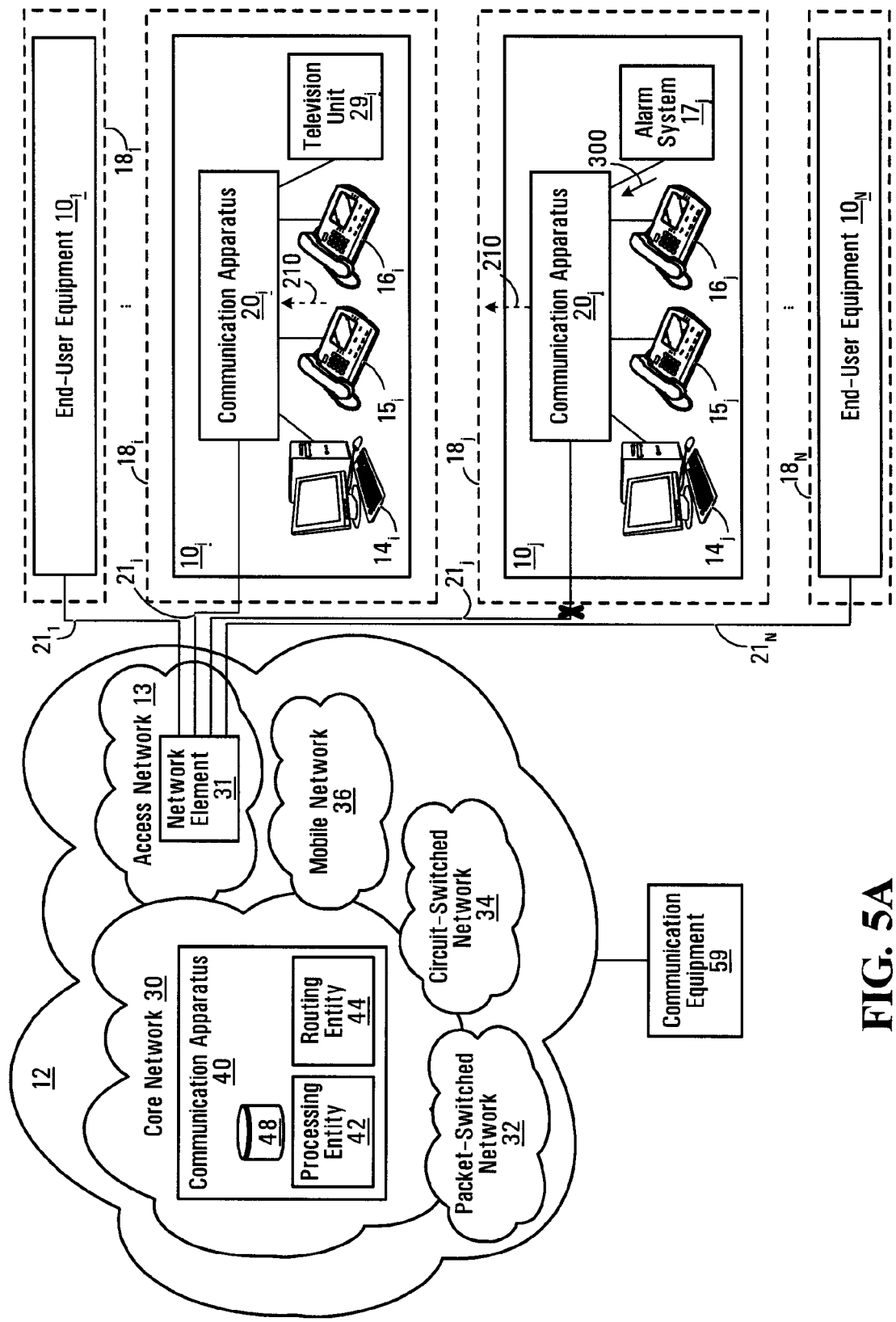
FIGS. 5A and 5B show an example in which a wireless communication link is established between the end-user equipment at a first one of the end-user premises and the end-user equipment at a second one of the end-user premises in order to allow information pertaining to a communication effected using the end-user equipment at the first one of the end-user premises to be exchanged over the communications network, when an ability of the end-user equipment at the first one of the end-user premises to communicate via a communication link connecting the end-user equipment at the first one of the end-user premises to the communications network is disrupted.
Figure 5B:
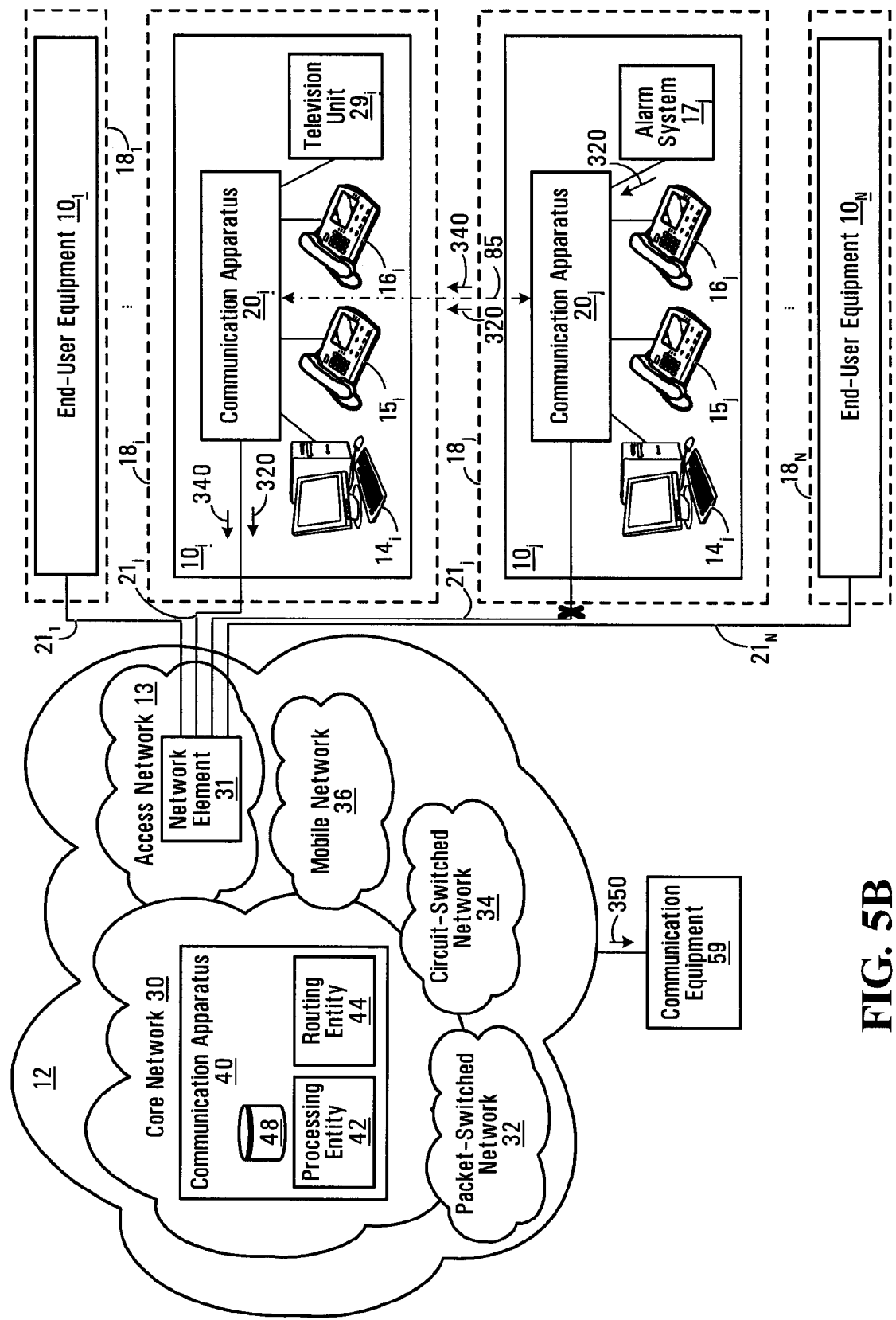

Turning to FIGS. 5A and 5B, an example illustrating how the end-user equipment $10_j$ at the end-user premise $18_j$ continues to be able to effect telephone calls, accesses to data network sites, alarm system communications, and/or other communications having certain origins over the communications network 12 when its ability to communicate via the communication link $21_j$ is disrupted, will now be considered.

In this example, the end-user equipment $10_j$ comprises, in addition to the communication apparatus $20_j$, a plurality of end-user devices, including a computer $14_j$, a VoIP phone $15_j$, a POTS phone $16_j$, and alarm system devices (e.g., detectors, a controller) of an alarm system $17_j$, which are connected to the communication apparatus $20_j$ via its connectors $52_1$-$52_M$ and/or its wireless interface 80.

At one point in time, a telephone call, an access to a data network site, an alarm system communication, and/or another communication is to be effected by the end-user equipment $10_j$. The communication is destined for communication equipment 59, which, depending on the nature of the communication, may comprise a telephone, a computer and/or another communication device.

More particularly, for purposes of this example, it is assumed that a detector of the alarm system $17_j$ issues a signal indicative of an undesirable event which, upon being received by a controller of the alarm system $17_j$, results in the alarm system $17_j$ attempting to effect an alarm system communication over the communications network 12 to notify an alarm monitoring central of this undesirable event. In this example, the detector is a glass break detector which issues the signal upon detecting that a window of the end-user premise $18_j$ has been broken, potentially intentionally by an intruder. It is further assumed that the communication equipment 59 is located at the alarm monitoring central and comprises a telephone, a computer and/or another communication device for which the alarm system communication is destined. The alarm monitoring central and the communication equipment 59 are operated by an alarm monitoring service provider, which may be the service provider operating the core network 30 or another service provider.

As shown in FIG. 5A, the communication apparatus $20_j$ receives information 300 from the alarm system $17_j$. The information 300 conveys a request for an alarm system communication originated by the alarm system $17_j$ due to issuance of the signal by the glass break detector. The information 300 comprises information indicative of a destination of the alarm system communication. More particularly, in this example, the destination of the alarm system communication is specified by an identifier of the communication equipment 59, such as a telephone number, an IP address, a URI (e.g., a SIP URI), a MAC address, EHA or other hardware identifier, and/or any other information identifying the communication equipment 59.

The processing entity 54 of the communication apparatus $20_j$ verifies the ability of the end-user equipment $10_j$ to communicate via the communication link $21_j$ to assess whether it is normal or disrupted (i.e., not normal). This verification may be performed in various manners.

For example, in this embodiment, the processing entity 54 of the communication apparatus $20_j$ verifies a state of the communication link $21_j$ to assess whether it is operating normally or is disrupted (i.e., not operating normally). The state of the communication link $21_j$ may be verified in various ways. For instance, in this embodiment, the state of the communication link $21_j$ may be verified using an exchange of signals along the communication link $21_j$ between the communication apparatus $20_j$ and one or more components of the communications network 12, such as the network element 31 of the access network 13 or the core network 30. The communication apparatus $20_j$ may repeatedly (e.g., periodically) transmit signals along the communication link $21_j$ to one or more components of the communications network 12 and expect receipt of a given acknowledgement signal from the communications network 12.

Such an exchange of signals can allow the communication apparatus $20_j$ to verify the state of the communication link $21_j$ using criteria that determine whether the communication link $21_j$ is operating normally or is disrupted. In some cases, the criteria may include one or more of the following factors: timeliness (e.g., signals have to be received and/or acknowledged within a particular timeframe); acknowledgement (e.g., a signal received by a component has to be acknowledged by the receiving component with a return signal); quality-of-service (e.g., the receiving component assesses a quality of the received signals to ensure that it conforms with a particular quality of service level). In other cases, the criteria may include other factors.

The state of the communication link $21_j$ may thus be assessed by determining whether the signals exchanged between the communication apparatus $20_j$ and the communications network 12 via this link satisfy the criteria. For example, the state of the communication link $21_j$ may be deemed to be normal if the following criteria are met: the exchange of signals is completed within the expected timeframe (e.g., five (5) seconds); a component having transmitted a signal receives a return signal acknowledging the receipt of the transmitted signal; and/or the exchange of signals is completed within the expected quality-of-service level. In contrast, the state of the communication link $21_j$ may be deemed to be disrupted based on an exchange where signals are late or missing, signals are unacknowledged by one or more components, and/or the quality of signals exchanged falls below the expected quality-of-service.

While in this embodiment the processing entity 54 of the communication apparatus $20_j$ verifies the state of the communication link $21_j$ based on an exchange of signals along the communication link $21_j$ between the communication apparatus $20_j$ and one or more components of the communications network 12, the processing entity 54 may assess the state of the communication link $21_j$ in various other ways in other embodiments. For example, in some embodiments, the processing entity 54 may determine that the communication link $21_j$ is disrupted based on information received from a source external to the communication apparatus $20_j$ and indicative of a disruption of the communication link $21_j$ (e.g., the communication apparatus 40 in the core network 30 may determine that the communication link $21_j$ is disrupted and cause the end-user equipment $10_i$ at the end-user premise $18_i$ to transmit information received via the wireless interface 70 of the communication apparatus $20_j$ and indicative of a disruption of the communication link $21_j$).

Also, in this embodiment, in addition to verifying the state of the communication link $21_j$, the processing entity 54 of the communication apparatus $20_j$ verifies a state of one or more software and/or hardware components (e.g., the modem 60, the network interface 50) of the end-user equipment $10_j$ that are used to effect communications via the communication link $21_j$ in order to assess whether they are operating normally or are disrupted (i.e., not operating normally). For example, the processing entity 54 may verify the state of the modem 60 to assess whether it is operating normally or not (e.g., by verifying whether the modem 60 has issued any error code indicative of a malfunction).

For purposes of this example, assume that the ability of the end-user equipment $10_j$ to communicate via the communication link $21_j$ is disrupted. Specifically, in this example, assume that the communication link $21_j$ is disrupted, for instance, due to a cut or other physical damage inflicted to it, and thus cannot be used to reliably exchange information between the end-user equipment $10_j$ and the communications network 12.

The processing entity 54 of the communication apparatus $20_j$ proceeds to determine whether the alarm system communication is to be effected over the communications network 12 despite the ability of the end-user equipment $10_j$ to communicate via the communication link $21_j$ being disrupted. More particularly, the processing entity 54 determines, based on an origin of the alarm system communication, whether the alarm system communication is to be effected over the communications network 12, despite the ability of the end-user equipment $10_j$ to communicate via the communication link $21_j$ being disrupted.

To that end, in this embodiment, the processing entity 54 of the communication apparatus $20_j$ identifies the origin of the alarm system communication. This may be performed in various ways. For example, in this embodiment, the information 300 received from the alarm system $17_j$ includes information indicative of the origin of the alarm system communication. More particularly, in this embodiment, it is assumed that the controller of the alarm system $17_j$ is connected to one of the connectors $52_1$-$52_M$ or the wireless interface 80 of the communication apparatus $20_j$ and that the information 300 received from the controller of the alarm system $17_j$ comprises an identifier of the alarm system $17_j$, such as a MAC address, EHA or other hardware identifier, an IP address, a URI (e.g., a SIP URI), and/or any other information that identifies the alarm system $17_j$. For purposes of this example, it is assumed that the identifier of the alarm system $17_j$ included in the information 300 is an IP address, say "10.10.2.4", assigned to the controller of the alarm system $17_j$.

In other embodiments, where the information 300 received from the alarm system $17_j$ does not include any information indicative of the origin the alarm system communication, if the alarm system $17_j$ is connected to a given one of the connectors $52_1$-$52_M$ of the communication apparatus $20_j$, the processing entity 54 may send a request to the alarm system $17_j$ via that given connector to obtain an identifier of the alarm system $17_j$. Alternatively, the processing entity 54 may consider an identifier of the given one of the connectors $52_1$-$52_M$ (e.g., a port number) as identifying the origin of the alarm system communication.

Also, in other embodiments, instead of being connected to the communication apparatus $20_j$, the controller of the alarm system $17_j$ may be part of the communication apparatus $20_j$ while one or more other alarm system devices of the alarm system $17_j$, including the glass break detector which detected the broken window, may be connected to the communication apparatus $20_j$ via one or more of its connectors $52_1$-$52_M$ and/or its wireless interface 80. For example, in some cases, the controller of the alarm system $17_j$ may be implemented by the processing entity 54 of the communication apparatus $20_j$. In such embodiments, the processing entity 54 may identify the origin of the alarm system communication based on an identifier of the glass break detector transmitted by the glass break detector and/or an identifier of a particular one of the connectors $52_1$-$52_M$ (e.g., a port number) to which the glass break detector may be connected.

Having identified the origin of the alarm system communication, the processing entity 54 of the communication apparatus $20_j$ accesses the database 66 of the communication apparatus $20_j$ to determine whether the origin of the alarm system communication corresponds to any origin specified by the communication origin information 49 in the database 66. More particularly, in this example, the processing entity 54 determines whether the origin of the alarm system communication specified by the information 300, i.e., the IP address "10.10.2.4", corresponds to any origin specified by the communication origin information 49 in the database 66. If not, the processing entity 54 performs no further action directed to effecting the alarm system communication. The processing entity 54 may perform some action to indicate to the alarm system $17_j$ that the alarm system communication cannot be effected since the communication link $21_j$ is disrupted (e.g., send information back to the controller of the alarm system $17_j$ indicating that the alarm system communication cannot be effected since the communication link $21_j$ is disrupted).

For purposes of this example, assume that the communication origin information 49 included in the database 66 of the communication apparatus $20_j$ includes: the IP address "10.10.2.4" assigned to the controller of the alarm system $17_j$; another IP address, say "10.10.2.19", which identifies the VoIP phone $15_j$ (indicating that any telephone call originated using the VoIP phone $15_j$ is to be effected over the communications network 12); and information indicative of a period of time, say "12:00 AM to 4:00 AM", during which any telephone call originated by the end-user equipment $10_j$ is to be effected over the communications network 12. The processing entity 54 thus determines that the IP address "10.10.2.4" specified by the information 300 corresponds to the IP address "10.10.2.4" specified by the communication origin information 49 in the database 66. Accordingly, the processing entity 54 determines that the alarm system communication is to be effected over the communications network 12 despite the communication link $21_j$ being disrupted.

Thus, the communication apparatus $20_j$ attempts to find another way to effect the alarm system communication over the communications network 12. More particularly, the communication apparatus $20_j$ attempts to implement a failover mechanism in which it attempts to establish a wireless communication link allowing it to effect the alarm system communication by routing the communication to the communications network 12 via this wireless communication link and another one of the communications links $21_1$-$21_N$.

The processing entity 54 of the communication apparatus $20_j$ accesses the database 66 of the communication apparatus $20_j$ to obtain the end-user equipment information 43 regarding end-user equipment at one or more other ones of the end-user premises $18_1$-$18_N$ that is within wireless range of the end-user equipment $10_j$ at the end-user premise $18_j$.

In this example, it is assumed that the end-user equipment information 43 in the database 66 of the communication apparatus $20_j$ includes end-user equipment information regarding the end-user equipment $10_i$ at the end-user premise $18_i$, which is within wireless range of the end-user equipment $10_j$ at the end-user premise $18_j$. The end-user equipment $10_i$ comprises, in addition to the communication apparatus $20_i$, a plurality of end-user devices, including a computer $14_i$, a VoIP phone $15_i$, another VoIP phone $16_i$, and a television unit $29_i$, which are connected to the communication apparatus $20_i$ via its connectors $52_1$-$52_M$ and/or its wireless interface 80. It is also assumed in this example that the end-user equipment information 43 included in the database 66 of the communication apparatus $20_j$ at the end-user premise $20_j$ includes an identifier of the communication apparatus $20_i$ (e.g., a MAC address, EHA, or other hardware identifier of the communication apparatus $20_i$, an IP address assigned to communication apparatus $20_i$, a URI (e.g., a SIP URI), or any other information that identifies the communication apparatus $20_i$) and access information to be provided to the communication apparatus $20_i$ in order to make use of the communication apparatus $20_i$ (e.g., a password or a wireless network key).

While in this example the end-user equipment information 43 in the database 66 pertains only to the end-user equipment $10_i$ at the end-user premise $18_i$, in other examples, the end-user equipment information 43 in the database 66 may include identifiers and access information for end-user equipment at other ones of the end-user premises $18_1$-$18_N$. In such a case, the processing entity 54 of communication apparatus $20_j$ may use a selection process to select one or more of the communication apparatuses $20_1$-$20_N$ listed in the database 66 with which it may attempt to establish a wireless communication link. For example, the selection process may define one or more "preferred" ones of the communication apparatuses $20_1$-$20_N$ listed in the database 66 that are predetermined by one or more components of the communications network 12, such as the communication apparatus 40 of the core network 30. As another example, the selection process may allow the processing entity 54 of the communication apparatus $20_j$ to decide with which of the other ones of the communication apparatuses $20_1$-$20_N$ listed in the database 66 it should attempt to establish a wireless communication link. For instance, the processing entity 54 may evaluate the other ones of the communication apparatuses $20_1$-$20_N$ listed in the database 66 based on criteria such as their physical proximity, wireless signal strength and/or reported network traffic load, and/or other factors. This may allow the communication apparatus $20_j$ to choose to establish a wireless communication link with a different one of the communication apparatuses $20_1$-$20_N$ listed in the database 66 every time the failover mechanism is initiated based on an evaluation of current signal strength and network traffic load.

Upon retrieving the identifier and access information of the communication apparatus $20_i$, the processing entity 54 of the communication apparatus $20_j$ causes the routing entity 62 of the communication apparatus $20_j$ to attempt to establish a wireless communication link between the communication apparatus $20_j$ and the communication apparatus $20_i$. More particularly, the processing entity 54 causes the routing entity 62 to wirelessly transmit information 210 to the communication apparatus $20_i$ via the wireless interface 70 of the communication apparatus $20_j$. The information 210 can be viewed as a request to access the communication apparatus $20_i$. In this example, the information 210 includes the identifier and access information of the communication apparatus $20_i$, as well as the identifier and access information of the communication apparatus $20_j$, which the processing entity 54 retrieved from the end-user equipment information 41 included in the database 66 of the communication apparatus $20_j$.

When it receives the information 210, the communication apparatus $20_i$ attempts to validate the identifier and access information of the communication apparatus $20_i$ that are included in the information 210. More particularly, the processing entity 54 of the communication apparatus $20_i$ verifies whether the identifier and access information of the communication apparatus $20_i$ that are included in the information 210 correspond to the identifier and access information of the communication apparatus $20_i$ that are included in the end-user equipment information 41 in the database 66 of the communication apparatus $20_i$. If not, the communication apparatus $20_i$ may deny the request of the communication apparatus $20_j$ to access the communication apparatus $20_i$ and may take some other action. For instance, the communication apparatus $20_i$ may send information back to the communication apparatus $20_j$ indicating that access to the communication apparatus $20_i$ is denied, and/or may send information to the communication apparatus 40 of the core network 30 to indicate that a failed connection attempt has occurred due to invalid credentials.

In this example, it is assumed that the identifier and access information of the communication apparatus $20_i$ that are included in the information 210 indeed correspond to the identifier and access information of the communication apparatus $20_i$ that are included in the end-user equipment information 41 in the database 66 of the communication apparatus $20_i$. Therefore, as shown in FIG. 5B, the communication apparatus $20_i$ grants access to the communication apparatus $20_j$, resulting in establishment of a wireless communication link 85 between the communication apparatus $20_j$ and the communication apparatus $20_i$.

With the wireless communication link 85 being established, the communication apparatus $20_j$ may proceed to effect the alarm system communication requested by the alarm system $17_j$ over the communications network 12 despite the disruption of the communications link $21_j$.

More particularly, the routing entity 62 of the communication apparatus $20_j$ transmits information 340 pertaining to the alarm system communication to the communications network 12 via the wireless communication link 85, the communication apparatus $20_i$ and the communication link $21_i$. The information 340 includes the identifier of the communication equipment 59 for which the alarm system communication is destined. In this example, the information 340 also includes the identifier of the alarm system $17_j$ and the identifier of the communication apparatus $20_j$.

The communication apparatus 40 of the core network 30 receives the information 340. The processing entity 42 of the communication apparatus 40 determines, based on the identifier of the communication equipment 59 included in the information 340, that the alarm system communication is destined for the communication equipment 59 of the alarm monitoring central. The processing entity 42 accesses the database 48 to search for a given one of the records $200_1$-$200_N$ in which the end-user equipment information 27 includes an identifier corresponding to the identifier of the alarm system $17_j$ (in this example, the IP address "10.10.2.4") and/or an identifier corresponding to the identifier of the communication apparatus $20_j$ included in the information 340. In this example, the processing entity 42 finds the record $200_j$, which is associated with the subscriber to which the service provider provides communication services to the end-user premise $18_j$ and in which the end-user equipment information 27 includes the identifier of the alarm system $17_j$ and/or the identifier of the communication apparatus $20_j$.

Upon finding the record $200_j$, the processing entity 42 retrieves the location information 23 included in the record $200_j$ and indicative of the physical location of the end-user premise $18_j$ (e.g., a civic address and/or a set of geo-coordinates). The processing entity 42 proceeds to cause the routing entity 44 of the communication apparatus 40 to transmit information 350 towards the communication equipment 59 of the alarm monitoring central. In addition to serving to convey the alarm system communication, the information 350 includes the location information 23 indicative of the physical location of the end-user premise $18_j$ in order to allow the alarm monitoring central to know where the alarm system communication originates from.

Once the information 350 is received by the communication equipment 59, an operator or a computer of the communication equipment 59 can receive and process the alarm system communication. Other information pertaining to the alarm system communication may then be exchanged between the alarm system $17_j$ and the operator or computer at the alarm monitoring central.

For example, the routing entity 62 of the communication apparatus $20_j$ may transmit information 320 pertaining to the alarm system communication to the communication equipment 59 over the communications network 12 via the wireless communication link 85, the communication apparatus $20_i$ and the communication link $21_i$. For instance, the information 320 may convey a pre-recorded or synthesized voice message for the operator or an encoded message for processing by the computer of the communication equipment 59 to notify the alarm monitoring central of the broken window detected at the end-user premise $18_j$ by the alarm system $17_j$. In addition, based on the location information 23 included in the information 350 received by the communication equipment 59, the operator or the computer of the communication equipment 59 knows the physical location of the end-user premise $18_j$ from which the alarm system communication originates.

In the other direction, information pertaining to the alarm system communication transmitted by the communication equipment 59 over the communications network 12 may be routed to the communication apparatus $20_j$ via the communication link $21_i$, the communication apparatus $20_i$ and the wireless communication link 85. For example, the information transmitted by the communication equipment 59 may include information indicative of one or more actions to be performed by the alarm system $17_j$ (e.g., one or more commands to be executed by the alarm system $17_j$ to check the state of the glass break detector which detected the broken window). As another example, in cases where the operator at the alarm monitoring central places a telephone call, say to the VoIP phone $15_j$, in an attempt to speak to an occupant of the end-user premise $18_j$ to check whether the broken window detected by the alarm system $17_j$ is accidental or not, the information transmitted by the communication equipment 59 may include call control information to establish the telephone call with the VoIP phone $15_j$.

Thus, information pertaining to the alarm system communication (such as the information 340, 320) can be exchanged between the communication apparatus $20_j$ and the communications network 12 by "piggybacking" this information on the communications link $21_i$. In this way, the alarm system communication can still be effected by the alarm system $17_j$ despite the disruption of the communication link $21_j$. This allows the alarm monitoring central to dispatch security agents and/or police officers to the end-user premise $18_j$ whose location has been provided to the alarm monitoring central.

In some embodiments, the wireless communication link 85 may remain established between the communication apparatus $20_j$ and the communication apparatus $20_i$ until the alarm system communication is terminated. Upon determining that the alarm system communication is terminated (e.g., by detecting that the telephone call established with the communication equipment 59 is terminated), the processing entity 54 of the communication apparatus $20_j$ may cause the routing entity 62 of the communication apparatus $20_j$ to wirelessly transmit information to the communication apparatus $20_i$ via the wireless interface 70 of the communication apparatus $20_j$ in order to disestablish the wireless communication link 85.

In other embodiments, the wireless communication link 85 may remain established between the communication apparatus $20_j$ and the communication apparatus $20_i$ until the disruption to the communication link $21_j$ is resolved. In other words, the wireless communication link 85 may remain established even after the termination of the alarm system communication (e.g., to allow the end-user equipment $10_j$ to make telephone calls and/or other communications, and/or to allow incoming calls and/or other communications to reach the end-user premise $18_j$, in light of the situation at the end-user premise $18_j$ where the window has been broken). For example, as mentioned above, this may allow the operator at the alarm monitoring central to place a telephone call to the end-user premise $10_j$, say to the VoIP phone $15_j$, in an attempt to speak to an occupant of the end-user premise $18_j$ to check whether the broken window detected by the alarm system $17_j$ is accidental or not. When the disruption to the communication link $21_j$ is resolved, the wireless communication link 85 becomes unnecessary and may be disestablished (i.e., terminated). To determine when the communication link $21_j$ is no longer disrupted (i.e., is operating normally once again), the communication apparatus $20_j$ may verify the state of the communication link $21_{j'}$. For example, this verification may be carried out periodically by the communication apparatus $20_j$, possibly more frequently while the communication link $21_j$ is disrupted, in order to detect when the communication link $21_j$ is no longer disrupted. As mentioned above, the state of the communication link $21_j$ may be verified using an exchange of signals between the communication apparatus $20_j$ and the communications network 12. When such an exchange of signals results in the proper criteria being met, the communication apparatus $20_j$ can deem the state of the communication link $21_j$ as being normal (i.e., non-disrupted) once again. Upon concluding that the state of the communication link $21_j$ is once again normal, the processing entity 54 of the communication apparatus $20_j$ may cause the routing entity 62 of the communication apparatus $20_j$ to wirelessly transmit information to the communication apparatus $20_i$ via the wireless interface 70 of the communication apparatus $20_j$ in order to disestablish the wireless communication link 85.

While in the example presented above the ability of the end-user equipment $10_j$ to communicate via the communication link $21_j$ is disrupted due to a disruption to the communication link $21_j$ itself, similar operations may occur when the ability of the end-user equipment $10_j$ to communicate via the communication link $21_j$ is disrupted due to some other reason, such as a defective or inoperative software or hardware component of the end-user equipment $10_j$ (e.g., the modem 60) normally used to effect communications over the communication link $21_{j'}$.

Also, while the example presented above involved an alarm system communication originated by the alarm system $17_{j'}$, similar operations may occur for other types of communications having certain origins that are originated using the end-user equipment $10_j$ at the end-user premise $18_j$. For instance, in the example mentioned above, the communication origin information 49 included in the database 66 includes the IP address "10.10.2.19" identifying the VoIP phone $15_j$ and the information indicative of the period of time "12:00 AM to 4:00 AM" during which any telephone call originated by the end-user equipment $10_j$ is to be effected over the communications network 12, and thus if a telephone call is originated either using the VoIP phone $15_j$ or using any piece of equipment of the end-user equipment $10_j$ between 12:00 AM and 4:00 AM while the ability of the end-user equipment $10_j$ to communicate via the communication link $21_j$ is disrupted, information pertaining to the telephone call (e.g., call control information to establish the telephone call and voice information provided by a calling party and a called party) may be exchanged over the communications network 12 via the communication apparatus $20_j$, the wireless communication link 85, the communication apparatus $20_i$ and the communication link $21_i$. Other types of communications, such as accesses to data network sites, having certain origins can be effected in a similar manner.

It will thus be appreciated that, in this embodiment, interaction between the communication apparatus $20_j$ at the end-user premise $18_j$ and the communication apparatus $20_i$ at the end-user premise $18_i$ provides a failover mechanism enabling the end-user equipment $10_j$ at the end-user premise $18_j$ to continue to be able to effect telephone calls, accesses to data network sites, alarm system communications, and/or other communications having certain origins over the communications network 12, despite the ability of the end-user equipment $10_j$ to communicate via the communication link $21_j$ being disrupted, by "piggybacking" on the communication link $21_i$ reaching the end-user premise $18_i$. In this way, telephone, data network (e.g., Internet), alarm system and/or other communication services may continue to be provided to the subscriber associated with the end-user premise $18_j$ in an uninterrupted fashion to allow particularly important communications to be effected, regardless of the ability of the end-user equipment $10_j$ to communicate via the communication link $21_j$ reaching the end-user premise $18_j$.

The failover mechanism contemplated herein may be implemented in various other ways in other embodiments.

For example, in some embodiments, one or more end-user devices of the end-user equipment $10_x$ at the end-user premise $18_x$ may have wireless capabilities that can be exploited to implement the failover mechanism contemplated herein.

Figure 6A:
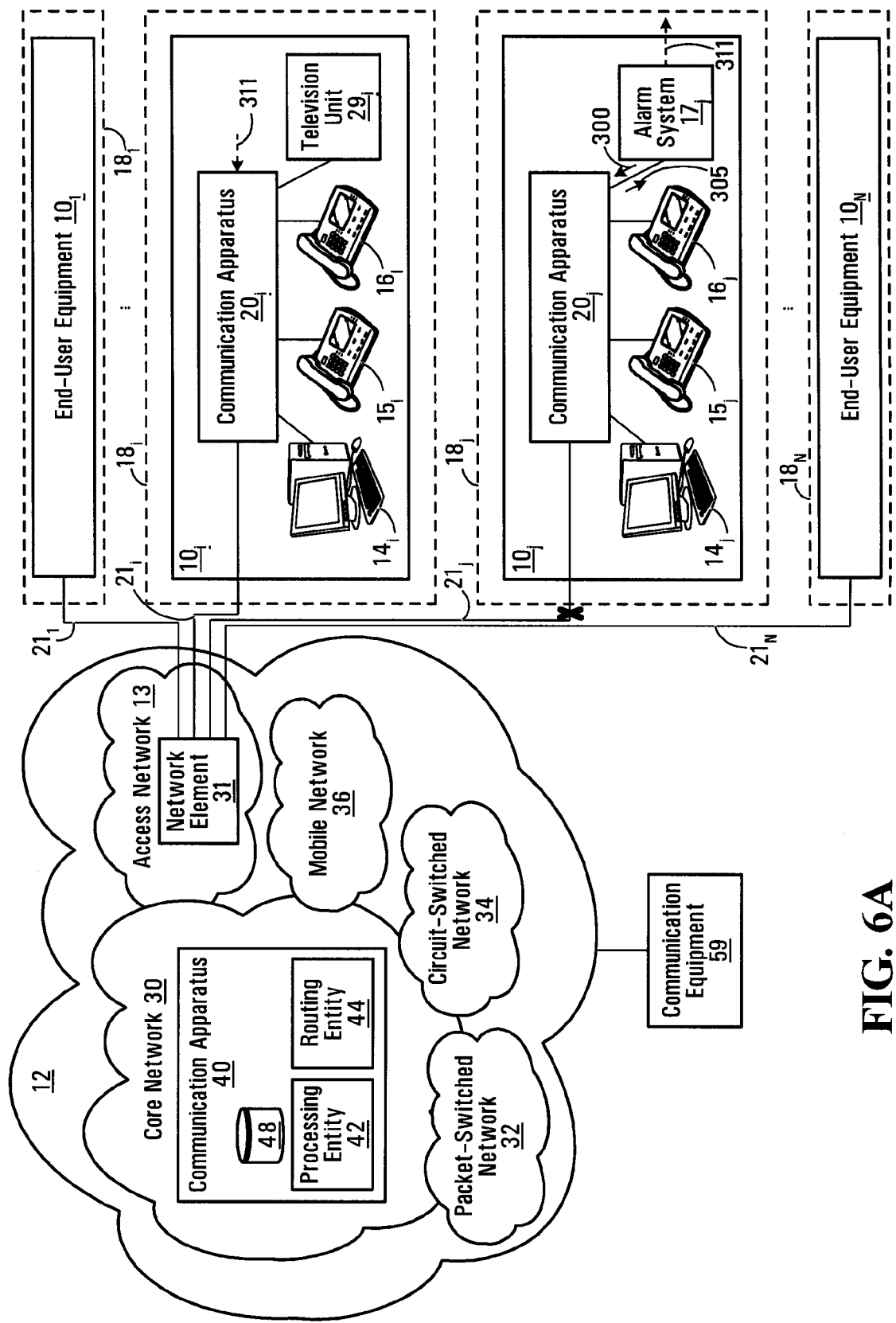
FIGS. 6A and 6B show a variant of the example considered in FIGS. 5A and 5B.

With reference to FIG. 6A, a variant to the example considered above will be discussed in which it is assumed that the alarm system $17_{j'}$, which detected the broken window at the end-user premise $18_{j'}$, is a wireless alarm system. That is, in this example, each of one or more devices of the alarm system $17_j$ comprises a wireless interface comprising a wireless transmitter and a wireless receiver that can wirelessly exchange information with another device of the alarm system $17_j$ and/or the wireless interface 80 of the communication apparatus $20_j$. More particularly, in this example, it is assumed that each of the glass break detector and the controller of the alarm system $17_j$ comprises a wireless interface allowing them to wirelessly exchange information with one another and with any other wireless-enabled device within range.

As in the example considered above, upon the glass break detector of the alarm system $17_j$ detecting the broken window at the end-user premise $18_j$, the communication apparatus $20_j$ receives the information 300 from the alarm system $17_{j'}$, which conveys the request for the alarm system communication and includes the information indicative of the destination of the alarm system communication, in this case, the identifier of the communication equipment 59 (e.g., a telephone number, an IP address, a URI (e.g., a SIP URI), a MAC address, EHA or other hardware identifier, and/or any other information identifying the communication equipment 59) for which the alarm system communication is destined. Also as in the example considered above, the communication apparatus $20_{j'}$, upon verifying the state of the communication link $21_{j'}$, determines that the communication link $21_j$ is disrupted (i.e., not operating normally). Also as in the example considered above, the communication apparatus $20_{j'}$, upon determining that the IP address "10.10.2.4" (identifying the controller of the alarm system $17_j$) specified by the information 300 corresponds to the IP address "10.10.2.4" specified by the communication origin information 49 in the database 66, determines that the alarm system communication is to be effected over the communications network 12 despite the communication link $21_j$ being disrupted.

Thus, the communication apparatus $20_j$ attempts to find another way to effect the alarm system communication requested by the alarm system $17_j$ over the communications network 12. More particularly, the communication apparatus $20_j$ attempts to implement a failover mechanism in which it attempts to establish a wireless communication link allowing it to effect the alarm system communication by routing the communication to the communications network 12 via this wireless communication link and another one of the communications links $21_1$-$21_N$.

The processing entity 54 of the communication apparatus $20_j$ accesses the database 66 of the communication apparatus $20_j$ to obtain the end-user equipment information 43 regarding end-user equipment at one or more other ones of the end-user premises $18_1$-$18_N$ that is within wireless range of the end-user equipment $10_j$ at the end-user premise $18_j$.

As in the example considered above, in this variant example, it is assumed that the end-user equipment information 43 in the database 66 of the communication apparatus $20_j$ includes an identifier of the communication apparatus $20_i$ (e.g., a MAC address, EHA, or other hardware identifier of the communication apparatus $20_i$, an IP address assigned to the communication apparatus $20_i$, a URI (e.g., a SIP URI) identifying the communication apparatus $20_i$, or any other information that identifies the communication apparatus $20_i$) and access information to be provided to the communication apparatus $20_i$ in order to make use of the communication apparatus $20_i$ (e.g., a password or a wireless network key).

The processing entity 54 of the communication apparatus $20_j$ retrieves the identifier and access information of the communication apparatus $20_i$. In the embodiment considered above, the communication apparatus $20_j$ uses this identifier and access information to establish the wireless communication link 85 between itself and the communication apparatus $20_i$. In this variant, however, the communication apparatus $20_j$ attempts to establish a wireless communication link between the alarm system $17_j$ and the communication apparatus $20_i$ instead.

More particularly, the routing entity 62 of the communication apparatus $20_j$ transmits information 305 to the alarm system $17_j$. In this embodiment, the information 305 is transmitted to the controller of the alarm system $17_j$. The information 305 includes the identifier and access information for the communication apparatus $20_i$ retrieved from the database 66 as well as an indication to establish a wireless communication link between itself, i.e., the alarm system $17_j$, and the communication apparatus $20_i$.

Upon receipt of the information 305, the controller of the alarm system $17_j$ wirelessly sends information 311 to the communication apparatus $20_i$ via its wireless interface. The information 311 includes the identifier and access information of the communication apparatus $20_i$ that was retrieved from the database 66 by the processing entity 54 of the communication apparatus $20_j$. In this example, the information 311 also includes the IP address "10.10.2.4" identifying the controller of the alarm system $17_j$.

When it receives the information 311, the communication apparatus $20_i$ attempts to validate the identifier and access information of the communication apparatus $20_i$ that are included in the information 311. More particularly, the processing entity 54 of the communication apparatus $20_i$ verifies whether the identifier and access information of the communication apparatus $20_i$ that are included in the information 311 correspond to the identifier and access information of the communication apparatus $20_i$ that are included in the end-user equipment information 41 in the database 66 of the communication apparatus $20_i$. If not, the communication apparatus $20_i$ may deny the request of the alarm system $17_j$ to access the communication apparatus $20_i$ and may take some other action. For instance, the communication apparatus $20_i$ may send information back to the alarm system $17_j$ indicating that access to the communication apparatus $20_i$ is denied, and/or may send information to the communication apparatus 40 of the core network 30 to indicate that a failed connection attempt has occurred due to invalid credentials.

Figure 6B:
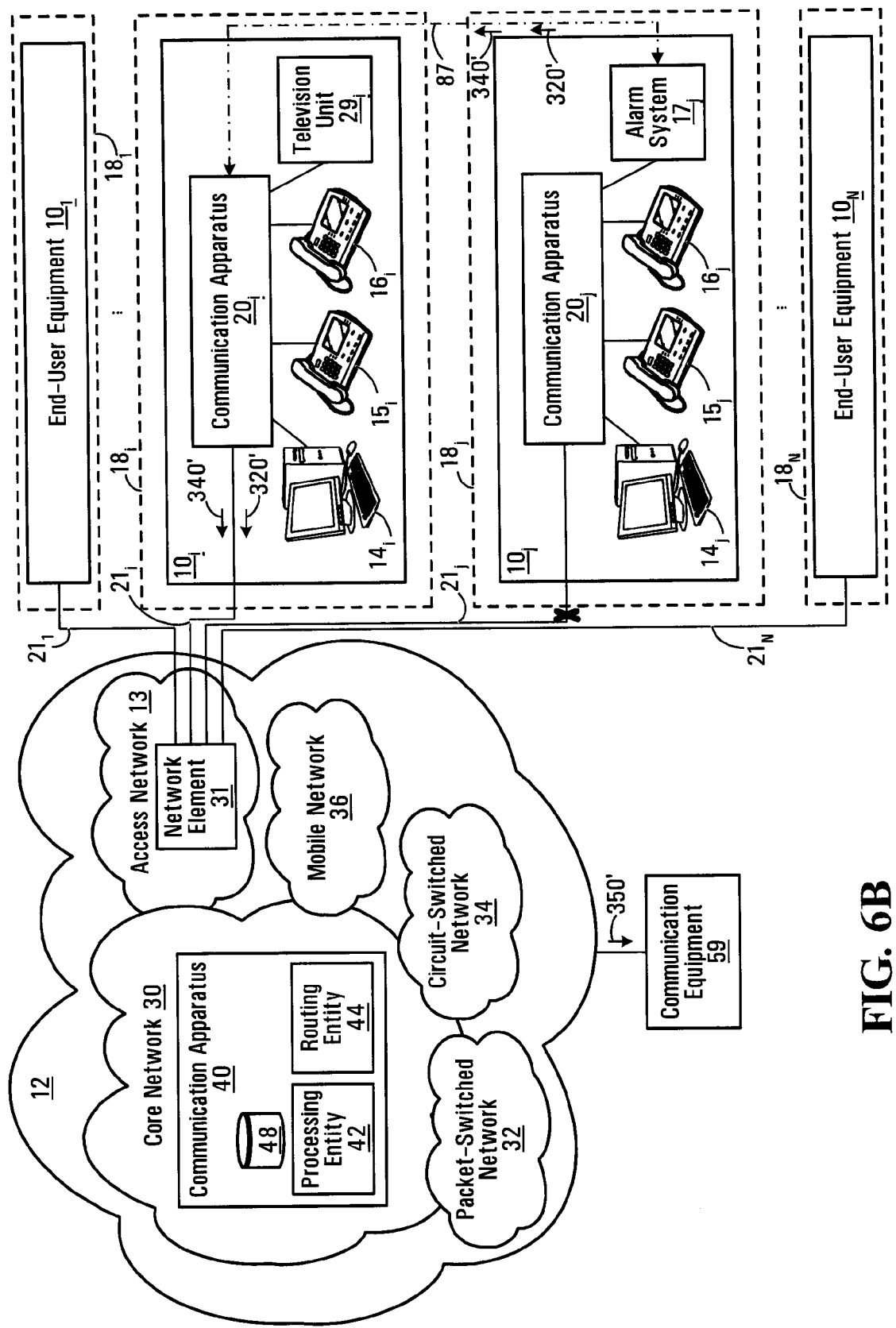

In this example, it is assumed that the identifier and access information of the communication apparatus $20_i$ that are included in the information 311 indeed correspond to the identifier and access information of the communication apparatus $20_i$ that are included in the end-user equipment information 41 in the database 66 of the communication apparatus $20_i$. Therefore, as shown in FIG. 6B, the communication apparatus $20_i$ grants access to the alarm system $17_j$, resulting in establishment of a wireless communication link 87 between the alarm system $17_j$ and the communication apparatus $20_i$.

With the wireless communication link 87 being established, the alarm system $17_j$ may proceed to effect the alarm system communication (due to detection of the broken window by the glass break detector) over the communications network 12 despite the disruption of the communication link $21_{j'}$.

More particularly, the alarm system $17_j$ transmits information 340' pertaining to the alarm system communication to the communications network 12 via the wireless communication link 87, the communication apparatus $20_i$ and the communication link $21_i$. The information 340' includes the identifier of the communication equipment 59 for which the alarm system communication is destined. In this example, the information 340' also includes the IP address "10.10.2.4" identifying the controller of the alarm system $17_j$ and the identifier of the communication apparatus $20_j$, which may be known by the alarm system $17_j$ due to its connection to the communication apparatus $20_j$ (and/or which may have been included in the information 305 received by the alarm system $17_j$).

The communication apparatus 40 of the core network 30 receives the information 340'. The processing entity 42 of the communication apparatus 40 determines, based on the identifier of the communication equipment 59 included in the information 340', that the alarm system communication is destined for the communication equipment 59 of the alarm monitoring central. The processing entity 42 accesses the database 48 to search for a given one of the records $200_1$-$200_N$ in which the end-user equipment information 27 includes an identifier corresponding to the identifier of the alarm system $17_j$ (in this example, the IP address "10.10.2.4") and/or an identifier corresponding to the identifier of the communication apparatus $20_j$ included in the information 340'. In this example, the processing entity 42 finds the record $200_j$, which is associated with the subscriber to which the service provider provides communication services to the end-user premise $18_j$ and in which the end-user equipment information 27 includes the identifier of the alarm system $17_j$ and/or the identifier of the communication apparatus $20_j$.

Upon finding the record $200_j$, the processing entity 42 retrieves the location information 23 included in the record $200_j$ and indicative of the physical location of the end-user premise $18_j$ (e.g., a civic address and/or a set of geo-coordinates). The processing entity 42 proceeds to cause the routing entity 44 of the communication apparatus 40 to transmit information 350' towards the communication equipment 59 of the alarm monitoring central. In addition to serving to convey the alarm system communication, the information 350' includes the location information 23 indicative of the physical location of the end-user premise $18_j$ in order to allow the alarm monitoring central to know where the alarm system communication originates from.

Once the information 350' is received by the communication equipment 59, an operator or a computer of the communication equipment 59 can receive and process the alarm system communication. Other information pertaining to the alarm system communication may then be exchanged between the alarm system $17_j$ and the operator or computer at the alarm monitoring central.

For example, the alarm system $17_j$ may transmit information 320' pertaining to the alarm system communication to the communication equipment 59 over the communications network 12 via the wireless communication link 87, the communication apparatus $20_i$ and the communication link $21_i$. For instance, the information 320' may convey a pre-recorded or synthesized voice message for the operator or an encoded message for processing by the computer of the communication equipment 59 to notify the alarm monitoring central of the broken window detected at the end-user premise 18$_j$ by the alarm system 17$_j$. In addition, based on the location information 23 included in the information 350' received by the communication equipment 59, the operator or the computer of the communication equipment 59 knows the physical location of the end-user premise 18$_j$ from which the alarm system communication originates.

In the other direction, information pertaining to the alarm system communication transmitted by the communication equipment 59 over the communications network 12 may be routed to the communication apparatus 20$_j$ via the communication link 21$_i$, the communication apparatus 20$_i$ and the wireless communication link 87. For example, the information transmitted by the communication equipment 59 may include information indicative of one or more actions to be performed by the alarm system 17$_j$ (e.g., one or more commands to be executed by the alarm system 17$_j$ to check the state of the glass break detector which detected the broken window).

Thus, information pertaining to the alarm system communication (such as the information 340', 320') can be exchanged between the alarm system 17$_j$ and the communications network 12 by "piggybacking" this information on the communications link 21$_i$. In this way, the alarm system communication can still be effected by the alarm system 17$_j$ despite the disruption of the communication link 21$_j$. This allows the alarm monitoring central to dispatch security agents and/or police officers to the end-user premise 18$_j$ whose location has been provided to the alarm monitoring central.

While this embodiment illustrates one way in which the failover mechanism contemplated herein may be implemented using wireless capabilities of one or more end-user devices of the end-user equipment 10$_x$ at the end-user premise 18$_x$, such wireless capabilities may be exploited in other ways in other embodiments to implement the failover mechanism.

For example, in some embodiments, when the ability of the end-user equipment 10$_x$ to communicate via the communication link 21$_x$ reaching the end-user premise 18$_x$ is determined to be disrupted, the communication apparatus 20$_x$ at the end-user premise 18$_x$ may establish a wireless communication link with a wireless-enabled end-user device that is part of the end-user equipment 10$_y$ at the end-user premise 18$_y$, rather than with the communication apparatus 20$_y$ directly. For instance, in the example considered above, the communication apparatus 20$_j$ at the end-user premise 18$_j$ may establish a wireless communication link between itself and the computer 14$_i$, the VoIP phone 15$_i$, or the VoIP phone 16$_i$ (using an identifier and possibly access information for that end-user device retrieved from the database 66 of the communication apparatus 20$_j$), such that information pertaining to the alarm system communication requested by the alarm system 17$_j$ may be exchanged between the alarm system 17$_j$ and the communication network 12 via this wireless communication link, the communication apparatus 20$_i$ and the communication link 21$_i$.

As another example, in some embodiments, when the ability of the end-user equipment 10$_x$ to communicate via the communication link 21$_x$ reaching the end-user premise 18$_x$ is determined to be disrupted, the communication apparatus 20$_x$ at the end-user premise 18$_x$ may establish a wireless communication link between a wireless-enabled end-user device that is part of the end-user equipment 10$_x$ and a wireless-enabled end-user device that is part of the end-user equipment 10$_y$ at the end-user premise 18$_y$. For instance, in the example considered above, the communication apparatus 20$_j$ at the end-user premise 18$_j$ may establish a wireless communication link between the alarm system 17$_j$ and the computer 14$_i$, the VoIP phone 15$_i$, or the VoIP phone 16$_i$ (using an identifier and possibly access information for that end-user device retrieved from the database 66 of the communication apparatus 20$_j$), such that information pertaining to the alarm system communication requested by the alarm system 17$_j$ may be exchanged between the alarm system 17$_j$ and the communication network 12 via this wireless communication link, the communication apparatus 20$_i$ and the communication link 21$_i$.

The embodiments considered above illustrate that, in some cases, it is useful or necessary for the communications network 12 and/or the communication equipment 59 for which a communication is destined to know the physical location from which the communication originates. Although in the embodiments considered above, the physical location from which the communication originates is derived by the communication apparatus 40 of the core network 30 by consulting the database 48 on a basis of an identifier of a piece of equipment of the end-user equipment 10$_x$ used to originate the communication (e.g., the identifier of the alarm system 17$_j$ or the identifier of the communication apparatus 20$_j$ in the example considered above), this physical location may be derived in various other ways in other embodiments.

For example, in some embodiments, information transmitted by a piece of equipment of the end-user equipment 10$_x$ used to originate a communication may include location information indicative of the physical location of the end-user premise 18$_x$ from which the communication originates. For instance, the database 66 of the communication apparatus 20$_x$ at the end-user premise 18$_x$ may include location information indicating the physical location of the end-user premise 18$_x$, such as a civic address, a set of geo-coordinates, and/or any other information that indicates the physical location of the end-user premise 18$_x$. This location information may be provided in the database 66 in various ways. For example, in some cases, this location information may be provided in the database 66 by a user at the end-user premise 18$_x$ when setting up the communication apparatus 20$_x$. In other cases, this location information may be provided in the database 66 by the service provider, for instance, by the communication apparatus 40 transmitting this location information via the communication link 21$_x$. In such embodiments, the location information included in the database 66 of the communication apparatus 20$_x$ may be transmitted to the communications network 12 to allow it and/or the communication equipment 59 to know the physical location of the end-user premise 18$_x$ from which the communication originates (e.g., in the example considered above, the location information included in the database 66 may be included in the information 340, 340' transmitted by the end-user equipment 10$_j$).

As another example, in some embodiments, the physical location of the end-user premise 18$_x$ from which a communication originates may be determined using triangulation techniques (e.g., multilateration or trilateration). For instance, location algorithms may determine the physical location of the end-user premise 18$_x$ based on three or more times of arrival of a signal wirelessly transmitted by a piece of equipment of the end-user equipment 10$_x$ (e.g., the communication apparatus 20$_x$) at three (3) or more wireless receivers having known locations that are distributed among the end-user equipment 10$_1$-10$_N$ at the end-user premises 18$_1$-18$_N$ and/or equipment at various other places. Such triangulation techniques, which can be based on times of arrival either explicitly (i.e., on the times of arrival themselves) or implicitly (i.e., on differences between the times of arrival), are well known and need not be described here. An example of a system enabling such location capabilities is the Wi-Fi Positioning System (WPS) provided by Skyhook Wireless Inc. and described at http://www.skyhookwireless.com/, which is hereby incorporated by reference herein.

Thus, using triangulation techniques, a "location" database including location information indicating the physical locations of the end-user equipment $10_1$-$10_N$ at the end-user premises $18_1$-$18_N$ (and possibly equipment at various other places) can be created and maintained by the service provider serving the end-user premises $18_1$-$18_N$ or by another party. The location database may associate the location information indicating the physical location of the end-user equipment $10_x$ to an identifier of a piece of equipment of the end-user equipment $10_x$ (e.g., the identifier of the communication apparatus $20_x$). In such embodiments, upon receiving an identifier of a piece of equipment of the end-user equipment $10_x$ which originates a communication (e.g., in the example considered above, the identifier of the communication apparatus $20_j$ which may be included in the information 340, 340' transmitted by the end-user equipment $10_j$), the communication apparatus 40 may obtain the location information indicating the physical location of the end-user premise $18_x$ from the location database on a basis of this identifier, either by having the processing entity 42 access the location database if it is managed by the service provider or by communicating with equipment of another party managing the location database. Once obtained, the location information indicating the physical location of the end-user premise $18_x$ may be used by the communication apparatus 40 and/or transmitted to the communication equipment 59 to know the physical location of the end-user premise $18_x$ from which the communication originates.

In the embodiments considered above, when the ability of the end-user equipment $10_x$ to communicate via the communication link $21_x$ is disrupted and a request for a communication originated by the end-user equipment $10_x$ is received, the processing entity 54 of the communication apparatus $20_x$ determines, based on an origin of the communication, whether the communication is to be effected by determining whether the origin of the communication corresponds to a predetermined origin specified by the communication origin information 49 in the database 66 of the communication apparatus $20_x$. The processing entity 54 of the communication apparatus $20_x$ may make such a determination in various other ways in other embodiments.

For example, in some embodiments, the processing entity 54 of the communication apparatus $20_x$ may determine, based on the origin of a communication, that the communication is to be effected over the communications network 12 despite the ability of the end-user equipment $10_x$ to communicate via the communication link $21_x$ being disrupted by determining that the origin of the communication corresponds to a predetermined origin specified in a processing logic implemented by the processing entity 54. For instance, the processing logic implemented by the processing entity 54 may include one or more conditional statements checking whether the origin of the communication corresponds to a predetermined origin (e.g., "if origin of communication is IP address "10.10.2.4", then effect communication"; "if origin of communication is port number 14, then effect communication"; etc.).

As another example, in some embodiments, the processing entity 54 of the communication apparatus $20_x$ may determine, based on the origin of a communication, that the communication is to be effected over the communications network 12 despite the ability of the end-user equipment $10_x$ to communicate via the communication link $21_x$ being disrupted by receiving an indication that the origin of the communication is associated with a requirement to effect the communication over the communications network 12. More particularly, rather than determining whether the origin of the communication corresponds to a predetermined origin (e.g., specified in the database 66 or in its processing logic), the processing entity 54 may receive an indication that the communication is to be effected over the communications network 12 because of its origin. For instance, an end-user device of the end-user equipment $10_x$ which transmits to the communication apparatus $20_x$ information conveying a request for a communication may include in this information an indication that the communication is to be effected over the communications network 12 because of its origin (e.g., in the example considered above, the controller of the alarm system $17_j$ may be configured to include in the information 300 transmitted to the communication apparatus $20_x$ an indication that the requested alarm system communication is to be effected over the communications network 12). The indication may be a flag or other code having an assigned meaning which, when received by the processing entity 54, results in the processing entity 54 determining that the communication has an origin that is such that the communication is to be effected over the communications network 12 despite the ability of the end-user equipment $10_x$ to communicate via the communication link $21_x$ being disrupted.

In the embodiments considered above, the communication apparatus $20_x$ at the end-user premise $18_x$ determines that the ability of the end-user equipment $10_x$ to communicate via the communication link $21_x$ reaching the end-user premise $18_x$ is disrupted (i.e., not normal) and proceeds to establish a wireless communication link between the end-user equipment $10_x$ at the end-user premise $18_x$ and the end-user equipment $10_y$ at the end-user premise $18_y$. In other embodiments, such functions may be implemented by other pieces of equipment of the end-user equipment $10_x$ at the end-user premise $18_x$ and/or of the communications network 12.

For example, in some embodiments, a given end-user device (e.g., a phone, computer, or alarm system device) at the end-user premise $18_x$ may itself determine that the ability of the end-user equipment $10_x$ to communicate via the communication link $21_x$ is disrupted (i.e., not normal) and proceed to implement the failover mechanism contemplated herein. In such embodiments, the given end-user device constitutes an apparatus implementing a processing entity and a routing entity operating in a manner similar to the processing entity 54 and the routing entity 62 of the communication apparatus $20_x$ in connection with the failover mechanism contemplated herein. For instance, in a variant to the example considered above, the wireless alarm system $17_j$ may determine that the communication apparatus $20_j$ is inoperative or malfunctioning or that the communication link $21_j$ is down (e.g., based on signals or lack of signals between the alarm system $17_j$ and the communication apparatus $20_j$). In such a variant, the wireless alarm system $17_j$ may store the identifier and access information of the communication apparatus $20_i$ in memory or request them from the database 66 of the communication apparatus $20_j$ and may use this information to establish a wireless communication link (such as the wireless communication link 87) in a manner similar to that described above.

As another example, in some embodiments, a disruption of the ability of the end-user equipment $10_x$ to communicate via the communication link $21_x$ may be determined by an apparatus of the communication network 12 (such as the communication apparatus 40 or the network element 31).

For instance, in one embodiment, the communications network 12 (and more particularly, the access network 13 or the core network 30) sends "heartbeat" signals to each of the communication apparatuses $20_1$-$20_N$ via the communication links $21_1$-$21_N$. When the communication link $21_x$ reaching the end-user premise $18_x$ and the communication apparatus $20_x$ at the end-user premise $18_x$ are operating normally, the communication apparatus $20_x$ receives a heartbeat signal from the communications network 12 and acknowledges its receipt by replying with a similar signal.

Because the communications network 12 sends the heartbeat signals to each of the communications apparatuses $20_1$-$20_N$ via the communication links $21_1$-$21_N$, the communications network 12 is able to identify potential disruptions to the respective abilities of the end-user equipment $10_1$-$10_N$ to communicate via these communication links by looking for certain ones of these communications apparatuses that have not replied to these heartbeat signals. Such a disruption may be determined by one or more components of the communications network 12, such as the network element 31 or another apparatus of the access network 13 and/or the communication apparatus 40 or another apparatus of the core network 30.

For instance, consider a variant to the example considered previously in which it is assumed that the communications network 12, and more particularly, the communication apparatus 40, identifies the disruption of the communication link $21_j$ reaching the end-user premise $18_j$ because "heartbeat" signals sent to the communication apparatus $20_j$ go unacknowledged. Further assume that the communication apparatus $20_j$ does not determine that the link $21_j$ is disrupted.

This results in a situation where the end-user equipment $10_j$ may not be able to effect telephone calls, accesses to data network sites, alarm system communications, and/or other communications since the communication apparatus $20_j$ has not determined that the communication link $21_j$ is disrupted. In particular, this may present risks, especially if a user needs to effect an important or emergency (e.g., 911) call to alert civic services (such as fire, police and ambulance services) or if the alarm system $17_j$ needs to effect an alarm system communication potentially indicative of an undesirable event (e.g., an intrusion or a fire at the end-user premise $18_x$). Also, the end-user equipment $10_j$ may be unable to receive incoming calls and/or other incoming communications.

To address this situation, in this embodiment, the communication apparatus 40 can try to alert the communication apparatus $20_j$ to the disruption of the communication link $21_j$ using the failover mechanism contemplated herein. For example, the communication apparatus 40 may try to contact the communication apparatus $20_j$ using the communication apparatus $20_i$ at the end-user premise $18_i$.

More particularly, in this embodiment, the processing entity 42 of the communication apparatus 40 retrieves the identifier and access information of the communication apparatus $20_j$ from the database 48 (which, in this embodiment, includes this access information). Once the processing entity 42 has performed this retrieval, the routing entity 44 of the communication apparatus 40 causes information including the identifier and access information of the communication apparatus $20_j$ to be transmitted to the communication apparatus $20_i$ via the communication link $21_i$. Alternatively, the processing entity 42 may cause the routing entity 44 to transmit to the communication apparatus $20_i$ via the communication link $21_i$ information instructing the processing entity 54 of the communication apparatus $20_i$ to retrieve the identifier and access information of the communication apparatus $20_j$ from the database 66 of the communication apparatus $20_i$. In any event, the information transmitted to the communication apparatus $20_i$ also includes an indication for the communication apparatus $20_i$ to establish a wireless communication link between itself and the communication apparatus $20_j$.

Upon receiving the information, the communication apparatus $20_i$ proceeds to establish a wireless communication link between itself and the communication apparatus $20_j$ using the identifier and access information of the communication apparatus $20_j$. With this wireless communication link being established, when telephone calls, accesses to data network sites, alarm system communications, and/or other communications having certain origins are to be effected using the end-user equipment $10_j$ at the end-user premise $18_j$, the communication apparatus $20_j$ proceeds to exchange information pertaining to these communications over the communications network 12 via the established wireless communication link, the communication apparatus $20_i$ and the communications link $21_i$ in a manner similar to that described previously herein.

Thus, an apparatus of the communications network 12 (such as the communication apparatus 40 or the network element 31) may be able to identify disruptions of the respective abilities of the end-user equipment $10_1$-$10_N$ to communicate via the communications links $21_1$-$21_N$ and implement failover operations to allow the end-user equipment $10_1$-$10_N$ at the end-user premises $18_1$-$18_N$ to continue to be used to effect communications having certain origins despite these disruptions.

Also, by having the communications network 12 manage certain aspects of the failover mechanism contemplated herein, the communications network 12 may use other information at its disposal to manage these aspects. For example, when the ability of the end-user equipment $10_x$ to communicate via the communication link $21_x$ reaching the end-user premise $18_x$ is determined to be disrupted, the communications network 12 may evaluate the current network traffic load being experienced by individual ones of the communication apparatuses $20_1$-$20_N$ within the particular geographic area around the end-user premise $18_x$. This evaluation may allow the communications network 12 to identify opportunities arising from "piggybacking" information onto one or more of the communications links $21_1$-$21_N$ that are currently experiencing low network traffic loads and therefore have more available resources than those links experiencing high network traffic loads. This may allow the failover mechanism to be used more efficiently among the communications apparatuses $20_1$-$20_N$ within a geographic area, possibly ensuring a higher and more consistent level of service to all users within this area. For instance, assume that the communication network 12 identifies the communication apparatuses $20_y$ and $20_z$ as two (2) apparatuses with acceptable signal strength proximate to the communication apparatus $20_x$ of the end-user equipment $10_x$ whose ability to communicate via the communication link $21_x$ is determined to be disrupted, with the communication apparatus $20_y$ currently experiencing a high network traffic load due to several ongoing communications made by the end-user equipment $10_y$ at the end-user premises $18_y$, while the communication apparatus $20_z$ is experiencing a very low traffic load since few or no communications are being made by the end-user equipment $10_z$ at the end-user premise $18_z$. In such a case, the communications network 12 may direct the communication apparatus $20_z$ to establish a wireless communication link with the communication apparatus $20_x$ since the communication apparatus $20_z$ and thus the communication link $21_z$ provides a greater capacity. In addition to or alternatively to considering network traffic loads, other factors may be taken into consideration by the communications network 12 to determine with which of the end-user equipment $10_1$-$10_N$ the end-user equipment $10_x$ is to establish a wireless communication link, such as reported signals strengths of signals exchanged between the end-user equipment $10_1$-$10_N$.

In some embodiments, the end-user equipment $10_x$ at the end-user premise $18_x$ may use a private network address space for one or more end-user devices of the end-user equipment $10_x$, while the communication apparatus $20_x$ may communicate via the communication link $21_x$ using a public network address space. For example, the communication apparatus $20_x$ may be assigned a public IP address by the communications network 12 (e.g., by the communication apparatus 40 of the core network 30) and the one or more end-user devices of the end-user equipment $10_x$ may be assigned private IP addresses by the communication apparatus $20_x$. In such embodiments, the routing entity 62 of the communication apparatus $20_x$ performs a network address translation (NAT) process on data packets passing therethrough to translate their addresses from the private network address space to the public network address space, and vice versa.

When the failover mechanism contemplated herein is invoked in these embodiments, in cases where a wireless communication link is established between the communication apparatus $20_x$ at the end-user premise $18_x$ and the communication apparatus $20_y$ at the end-user premise $18_y$, the NAT process performed by the communication apparatus $20_x$ and, if applicable, the NAT process performed by the communication apparatus $20_y$ can take into account the establishment of the wireless communication link in order to avoid potential private network address clashes.

For example, considering the previous example discussed in connection with FIGS. 5A and 5B where the wireless communication link 85 is established between the communication apparatus $20_j$ at the end-user premise $18_j$ and the communication apparatus $20_i$ at the end-user premise $18_i$ upon the alarm system $17_j$ originating the alarm system communication while the communication link $21_j$ is disrupted, it is assumed that (prior to the wireless communication link 85 being established) the computer $14_j$, the VoIP phone $15_j$, an ATA associated with the POTS phone $16_j$, and the alarm system devices of the alarm system $17_j$ are assigned private IP addresses by the communication apparatus $20_j$ which is itself assigned a public IP address by the communications network 12, and that the computer $14_i$, the VoIP phone $15_i$, the VoIP phone $16_i$ and the television unit $29_i$ are assigned private IP addresses by the communication apparatus $20_i$ which is itself assigned a public IP address by the communications network 12. More particularly, for purposes of this example, assume that the public IP address assigned to the communication apparatus $20_j$ is "122.1.17.6", the private IP address assigned to the alarm system $17_j$ is "10.10.2.4", and the public IP address assigned to the communication apparatus $20_i$ is "122.28.5.18".

In establishing the wireless communication link 85, the routing entity 62 of the communication apparatus $20_i$ assigns a private IP address to the communication apparatus $20_j$, say "10.50.50.3" for purposes of this example. In other words, the communication apparatus $20_j$ can be viewed as becoming part of the private network address space used by the end-user equipment $10_i$ at the end-user premise $18_i$. The routing entity 62 of the communication apparatus $20_j$ takes note of the private IP address "10.50.50.3" assigned to it by the communication apparatus $20_i$.

Upon receiving data packets transmitted by the alarm system $17_j$ which have the private IP address "10.10.2.4" as their source address, the routing entity 62 of the communication apparatus $20_j$ performs the NAT process on these data packets. As part of the NAT process, the routing entity 62 notes destination addresses and possibly destination ports of the data packets in a database (e.g., a connection state table) and sends to the communication apparatus $20_i$ modified versions of the data packets such that they have the private IP address "10.50.50.3" as their source address.

The routing entity 62 of the communication apparatus $20_i$ receives the data packets transmitted by the communication apparatus $20_j$ which have the private IP address "10.50.50.3" as their source address and proceeds to perform the NAT process on these data packets. As part of the NAT process, the routing entity 62 notes destination addresses and possibly destination ports of the data packets in a database (e.g., a connection state table) and sends over the communications network 12 via the communication link $21_i$ modified versions of the data packets such that they have the public IP address "122.28.5.18" as their source address.

In the reverse direction, when the communication apparatus $20_i$ receives via the communication link $21_i$ data packets pertaining to the alarm system communication which have the public IP address "122.28.5.18" as their destination address, the routing entity 62 of the communication apparatus $20_i$ performs the NAT process on these data packets by consulting the aforementioned database (e.g., connection state table) based on their source addresses and optionally source ports and sends to the communication apparatus $20_j$ modified versions of these data packets such that they have the private IP address "10.50.50.3" as their destination address.

The routing entity 62 of the communication apparatus $20_j$ receives the data packets transmitted by the communication apparatus $20_i$ which have the private IP address "10.50.50.3" as their destination address and proceeds to perform the NAT process on these data packets by consulting the aforementioned database (e.g., connection state table) based on their source addresses and optionally source ports. This results in the routing entity 62 sending to the alarm system $17_j$ modified versions of the data packets such that they have the private IP address "10.10.2.4" as their destination address.

While the embodiment considered above illustrates one way in which NAT may be taken into account in implementing the failover mechanism contemplated herein, NAT may be taken into account in various other ways in other embodiments. Also, in some embodiments, NAT may not be needed and/or may not be performed (e.g., in cases where an IPv6 addressing scheme is used).

Those skilled in the art will appreciate that, in some embodiments, certain functionality of a given element described herein (e.g., the communication apparatus 40, any piece of equipment of the end-user equipment $10_x$ such as the communication apparatus $20_x$) may be implemented as pre-programmed hardware or firmware components (e.g., application specific integrated circuits (ASICs), electrically erasable programmable read-only memories (EEPROMs), etc.) or other related components. In other embodiments, a given element described herein (e.g., the communication apparatus 40, any piece of equipment of the end-user equipment $10_x$ such as the communication apparatus $20_x$) may comprise a processor having access to a memory which stores program instructions for execution by the processor to implement certain functionality of that given element. The program instructions may be stored on data storage media that is fixed, tangible, and readable directly by the processor. The data storage media may store data optically (e.g., an optical disk such as a CD-ROM or a DVD), magnetically (e.g., a hard disk drive, a removable diskette), electrically (e.g., semiconductor memory, floating-gate transistor memory, etc.), and/or in various other ways. Alternatively, the program instructions may be stored remotely but transmittable to the given element via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Although various embodiments of the invention have been described and illustrated, it will be apparent to those skilled in the art that numerous modifications and variations can be made without departing from the scope of the invention, which is defined in the appended claims.

The invention claimed is:

1. A method for effecting communications over a communications network, said method comprising:
  receiving a request for a communication originated by first end-user equipment at a first end-user premise when an ability of the first end-user equipment to communicate via a first communication link connecting the first end-user equipment to the communications network is disrupted;
  determining, based on an origin of the communication that is specified by an identifier of a piece of equipment of the first end-user equipment from which the communication originates, that the communication is to be effected over the communications network; and
  causing information pertaining to the communication to be exchanged between the first end-user equipment and the communications network via a wireless communication link established between the first end-user equipment and second end-user equipment at a second end-user premise and a second communication link connecting the second end-user equipment to the communications network.

2. The method as claimed in claim 1, comprising determining that the ability of the first end-user equipment to communicate via the first communication link is disrupted.

3. The method as claimed in claim 2, said determining comprising verifying the ability of the first end-user equipment to communicate via the first communication link.

4. The method as claimed in claim 3, said verifying comprising:
  performing a verification of a state of the first communication link based on a signal conveyable via the first communication link; and
  determining that the first communication link is disrupted based on a result of the verification.

5. The method as claimed in claim 4, said determining that the first communication link is disrupted based on a result of the verification comprising determining that the signal is not received within a period of time or does not satisfy a quality-of-service condition.

6. The method as claimed in claim 3, said verifying comprising:
  performing a verification of a state of a software or hardware component of the first end-user equipment; and
  determining that the software or hardware component of the first end-user equipment is disrupted based on a result of the verification.

7. The method as claimed in claim 2, said determining comprising receiving information indicative of a disruption of the ability of the first end-user equipment to communicate via the first communication link.

8. The method as claimed in claim 7, the information indicative of a disruption of the ability of the first end-user equipment to communicate via the first communication link comprising information indicative of a disruption of the first communication link.

9. The method as claimed in claim 1, said determining comprising determining that the origin of the communication corresponds to a predetermined origin.

10. The method as claimed in claim 9, said determining that the origin of the communication corresponds to the predetermined origin comprising accessing a database and concluding that the origin of the communication corresponds to an origin specified in the database.

11. The method as claimed in claim 1, said determining comprising receiving an indication that the origin of the communication is such that the communication is to be effected over the communications network.

12. The method as claimed in claim 1, the identifier comprising at least one of an Internet Protocol (IP) address assigned to the piece of equipment and a hardware identifier of the piece of equipment.

13. The method as claimed in claim 12, the hardware identifier comprising at least one of a Media Access Control (MAC) address and an Ethernet hardware address.

14. The method as claimed in claim 1, the origin of the communication being specified by a time at which the communication is originated.

15. The method as claimed in claim 1, comprising establishing the wireless communication link between the first end-user equipment and the second end-user equipment upon the ability of the first end-user equipment to communicate via the first communication link being determined to be disrupted.

16. The method as claimed in claim 15, said establishing comprising causing a first one of the first end-user equipment and the second end-user equipment to wirelessly transmit certain information to a second one of the first end-user equipment and the second end-user equipment to establish the wireless communication link.

17. The method as claimed in claim 16, the certain information comprising an identifier of the second end-user equipment.

18. The method as claimed in claim 17, the identifier of the second end-user equipment comprising at least one of a hardware identifier and an IP address.

19. The method as claimed in claim 18, the hardware identifier comprising at least one of a MAC address and an Ethernet hardware address.

20. The method as claimed in claim 17, the certain information comprising access information for the second end-user equipment.

21. The method as claimed in claim 20, the access information for the second end-user equipment comprising at least one of a password and a wireless network key.

22. The method as claimed in claim 20, the certain information comprising access information for the first end-user equipment.

23. The method as claimed in claim 22, each of the access information for the first end-user equipment and the access information for the second end-user equipment comprising at least one of a password and a wireless network key.

24. The method as claimed in claim 15, the first-end user equipment comprising a communication apparatus connected to the first communication link and to an end-user device at the first end-user premise, said method being performed by the communication apparatus.

25. The method as claimed in claim 24, said establishing comprising wirelessly transmitting certain information to the second end-user equipment to establish the wireless communication link between the communication apparatus and the second end-user equipment.

26. The method as claimed in claim 25, the second end-user equipment comprising a communication apparatus connected to the second communication link and to an end-user device at the second end-user premise, said wirelessly transmitting comprising wirelessly transmitting the certain information to the communication apparatus of the second end-user equipment to establish the wireless communication link between the communication apparatus of the first end-user equipment and the communication apparatus of the second end-user equipment.

27. The method as claimed in claim 25, the second end-user equipment comprising a communication apparatus connected to the second communication link and to an end-user device at the second end-user premise, said wirelessly transmitting comprising wirelessly transmitting the certain information to the end-user device at the second end-user premise to establish the wireless communication link between the communication apparatus of the first end-user equipment and the end-user device at the second end-user premise.

28. The method as claimed in claim 24, said establishing comprising causing the end-user device at the first end-user premise to wirelessly transmit certain information to the second end-user equipment to establish the wireless communication link between the end-user device at the first end-user premise and the second end-user equipment.

29. The method as claimed in claim 1, the information pertaining to the communication comprising information allowing a physical location of the first end-user premise to be identified.

30. The method as claimed in claim 29, the information allowing the physical location of the first end-user premise to be identified comprising location information indicative of the physical location of the first end-user premise.

31. The method as claimed in claim 29, the information allowing the physical location of the first end-user premise to be identified comprising the identifier of the piece of equipment of the first end-user equipment, the identifier being associated in a database with location information indicative of the physical location of the first end-user premise.

32. The method as claimed in claim 1, the communication being an alarm system communication.

33. The method as claimed in claim 1, the communication being a telephone call and the information pertaining to the telephone call including voice information provided during the telephone call.

34. The method as claimed in claim 1, the communication being an outgoing communication, said method comprising causing information pertaining to an incoming communication originated by communication equipment connected to the communications network to be exchanged between the first end-user equipment and the communication equipment via the wireless communication link and the second communication link.

35. The method as claimed in claim 34, the incoming communication being an incoming telephone call and the information pertaining to the incoming telephone call including voice information provided during the incoming telephone call.

36. Apparatus for effecting communications over a communications network, said apparatus comprising:
  a processing entity configured to:
    receive a request for a communication originated by first end-user equipment at a first end-user premise when an ability of the first end-user equipment to communicate via a first communication link connecting the first end-user equipment to the communications network is disrupted; and
    determine, based on an origin of the communication that is specified by an identifier of a piece of equipment of the first end-user equipment from which the communication originates, that the communication is to be effected over the communications network; and
  a routing entity configured to cause information pertaining to the communication to be exchanged between the first end-user equipment and the communications network via a wireless communication link established between the first end-user equipment and second end-user equipment at a second end-user premise and a second communication link connecting the second end-user equipment to the communications network.

37. Non-transitory computer-readable media containing a program element executable by a computing system to perform a method for effecting communications over a communications network, said program element comprising:
  program code for causing the computing system to receive a request for a communication originated by first end-user equipment at a first end-user premise when an ability of the first end-user equipment to communicate via a first communication link connecting the first end-user equipment to the communications network is disrupted;
  program code for causing the computing system to determine, based on an origin of the communication that is specified by an identifier of a piece of equipment of the first end-user equipment from which the communication originates, that the communication is to be effected over the communications network; and
  program code for causing the computing system to cause information pertaining to the communication to be exchanged between the first end-user equipment and the communications network via a wireless communication link established between the first end-user equipment and second end-user equipment at a second end-user premise and a second communication link connecting the second end-user equipment to the communications network.

38. A method for effecting an alarm system communication originated by an alarm system at a first end-user premise, the first end-user premise including first end-user equipment connected to a communications network via a first communication link, said method comprising:
  determining that an ability of the first end-user equipment to communicate via the first communication link is disrupted;
  based on an origin of the alarm system communication that is specified by an identifier of a piece of equipment at the first end-user premise from which the alarm system communication originates, establishing a wireless communication link between the first end-user equipment and second end-user equipment at a second end-user premise upon the ability of the first end-user equipment to communicate via the first communication link being determined to be disrupted; and
  causing information pertaining to the alarm system communication to be transmitted to communication equipment associated with an alarm monitoring central via the wireless communication link and a second communication link connecting the second end-user equipment to the communications network.

39. The method as claimed in claim 38, the information comprising an indication of an event detected by a detector of the alarm system at the first end-user premise.

40. The method as claimed in claim 38, the information pertaining to the alarm system communication comprising information allowing a physical location of the first end-user premise to be identified.

41. The method as claimed in claim 40, the information allowing the physical location of the first end-user premise to be identified comprising location information indicative of the physical location of the first end-user premise.

42. The method as claimed in claim 40, the information allowing the physical location of the first end-user premise to be identified comprising an identifier of a piece of equipment of the first end-user equipment, the identifier being associated in a database with location information indicative of the physical location of the first end-user premise.

43. The method as claimed in claim 38, comprising causing information pertaining to an incoming telephone call originated by the communication equipment associated with the alarm monitoring central to be exchanged between the first end-user equipment and the communication equipment associated with the alarm monitoring central via the wireless communication link and the second communication link, the information pertaining to the incoming telephone call including voice information provided during the incoming telephone call.

44. The method as claimed in claim 1, an identity of the second end-user equipment being determined prior to determining that the ability of the first end-user equipment to communicate via the first communication link is disrupted.

45. The apparatus as claimed in claim 36, an identity of the second end-user equipment being determined prior to determining that the ability of the first end-user equipment to communicate via the first communication link is disrupted.

46. The non-transitory computer-readable media as claimed in claim 37, an identity of the second end-user equipment being determined prior to determining that the ability of the first end-user equipment to communicate via the first communication link is disrupted.

* * * * *